(12) United States Patent
Fruehling et al.

(10) Patent No.: US 12,455,421 B2
(45) Date of Patent: Oct. 28, 2025

(54) RAPID FIBER OPTIC ALIGNMENT TECHNIQUES FOR OPTICAL SWITCHING

(71) Applicant: Texas Instruments Incorporated, Dallas, TX (US)

(72) Inventors: Adam Joseph Fruehling, Garland, TX (US); James Norman Hall, Parker, TX (US); Argyrios Dellis, Culver City, CA (US); Terry Alan Bartlett, Dallas, TX (US); Patrick Ian Oden, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/731,606

(22) Filed: Apr. 28, 2022

(65) Prior Publication Data

US 2023/0350141 A1 Nov. 2, 2023

(51) Int. Cl.
*G02B 6/42* (2006.01)
*G02B 6/35* (2006.01)

(52) U.S. Cl.
CPC ......... *G02B 6/4227* (2013.01); *G02B 6/3556* (2013.01); *G02B 6/4225* (2013.01); *G02B 6/4249* (2013.01); *G02B 6/3512* (2013.01); *G02B 6/359* (2013.01)

(58) Field of Classification Search
CPC .... G02B 6/3586; G02B 6/3588; G02B 6/359; G02B 6/4227
See application file for complete search history.

(56) References Cited

U.S. PATENT DOCUMENTS

| | | | |
|---|---|---|---|
| 6,222,954 B1* | 4/2001 | Riza | G02B 6/29395 385/18 |
| 6,697,547 B2* | 2/2004 | Walter | G02B 6/266 385/140 |
| 6,792,170 B2* | 9/2004 | Kiadeh | G02B 6/3572 385/14 |

(Continued)

OTHER PUBLICATIONS

Gerchberg, R.W.; Saxton, W.O. "A practical algorithm for the determination of phase from image and diffraction plane pictures", Optik 1972, 35, 237-246.

(Continued)

*Primary Examiner* — Chad H Smith
(74) *Attorney, Agent, or Firm* — Michael T. Gabrik; Frank D. Cimino

(57) ABSTRACT

A method of aligning optical signals in a fiber optic switching device with one or two phase light modulators (PLMs) includes configuring the phase elements of the PLMs with first initial settings, to direct an optical signal from an input fiber to an output fiber. An initial position displacement of a center of the signal image from a center of the output fiber is estimated. Corrected settings for the phase elements are calculated so that when the corrected settings are applied to the phase elements, a corrected signal image of the optical signal has a corrected position displacement from the center of the output fiber that is less than the initial position displacement. A fiber optic switching device has processing circuitry and a memory component configured to execute steps of the method of aligning the optical signals.

24 Claims, 19 Drawing Sheets

(56) References Cited

U.S. PATENT DOCUMENTS

| | | | | |
|---|---|---|---|---|
| 6,882,769 B1 * | 4/2005 | Maitan | ............... | H04Q 11/0005 385/25 |
| 7,822,303 B2 * | 10/2010 | Cohen | ................ | G02B 6/29383 385/11 |
| 2003/0206686 A1 * | 11/2003 | Pau | .................... | H04Q 11/0005 385/18 |

OTHER PUBLICATIONS

Zhao, T.; Chi, Y.; "Modified Gerchberg-Saxton (G-S) Algorithm and Its Application", Entropy 2020, 22, 1354.
Kawajiri, Y., et al., "512 x 512 Port 3D MEMS Optical Switch Module with Toroidal Concave Mirror", NTT Technical Review vol. 10 No. 11 Nov. 2012.

* cited by examiner

RAPID FIBER OPTIC ALIGNMENT TECHNIQUES FOR OPTICAL SWITCHING

TECHNICAL FIELD

This description relates to the field of fiber optic switching devices. More particularly, but not exclusively, this description relates to fiber optic switching devices with phase light modulators.

BACKGROUND

Fiber optic switching devices may be used to route optical signals from an array of input fibers to an array of output fibers. Fiber optic switching devices with phase light modulators (PLMs) use the PLMs to image an optical signal from a selected input fiber onto a selected output fiber. Spatial distances between the input fibers, the output fibers, and the PLMs are orders of magnitude greater than diameters of the optical fibers. Misalignments of the arrays of input fibers and output fibers and the PLMs, and misalignments of the individual optical fibers within the arrays of input fibers and output fibers may reduce signal strengths and increase bit error rates. Reducing misalignments in fiber optic switching devices with PLMs is challenging.

SUMMARY

This description describes a method of aligning optical signals in a fiber optic switching device including two phase light modulators (PLMs). The fiber optic switching device includes an input fiber array having input fibers and an output fiber array having output fibers. A first PLM is located so that optical signals from the input fibers are directed by the first PLM onto a second PLM; the second PLM is located so that the optical signals are directed by the second PLM onto the output fibers. The first PLM has first phase elements, each of which modifies a phase of the optical signal, and the second PLM has second phase elements with similar functionalities.

The method of aligning the optical signals includes configuring the first phase elements with first initial settings and configuring the second phase elements with second initial settings, to direct an optical signal from a first input fiber to a first output fiber. The optical signal is generated, and an initial position displacement of the signal image from a center of the first output fiber is estimated. First corrected settings for the first phase elements and second corrected settings for the second phase elements are calculated so that when the corrected settings are applied to the first phase elements and the second phase elements, a corrected signal image of the optical signal has a corrected position displacement from the center of the first output fiber that is less than the initial position displacement.

This description describes a fiber optic switching device, including two PLMs. The fiber optic switching device includes an input fiber array having input fibers and an output fiber array having output fibers. A first PLM is located so that optical signals from the input fibers are directed by the first PLM onto a second PLM; the second PLM is located so that the optical signals are directed by the second PLM onto the output fibers. The first PLM has first phase elements, each of which modifies a phase of the optical signal, and the second PLM has second phase elements with similar functionalities. The fiber optic switching device also includes a memory component having data for setting phases of the first phase elements and the second phase elements. The fiber optic switching device further includes processing circuitry configured to set the first phase elements with first initial settings and set the second phase elements with second initial settings, to direct an optical signal from the first input fiber to a first output fiber. The processing circuitry is configured to subsequently generate an optical signal from the first input fiber of the input fiber array, the first optical signal being imaged onto the output fiber array by the first phase elements and the second phase elements, to form an initial signal image on the output fiber array. The processing circuitry is also configured to estimate an initial position displacement of the initial signal image from a center of the first output fiber. The processing circuitry is further configured to calculate first corrected settings for the first phase elements and second corrected settings for the second phase elements. The first and second corrected settings are calculated so that the first and second corrected settings applied to the first and second phase elements are configured to produce a first corrected signal image of the first optical signal having a corrected position displacement from the center of the first output fiber that is less than the initial first position displacement.

This description describes a method of aligning optical signals in a fiber optic switching device including a single PLM. The PLM is located so that optical signals from input fibers are directed by the PLM onto output fibers by phase elements of the PLM. The method of aligning the optical signals includes configuring the phase elements with initial settings, to direct an optical signal from a first input fiber to a first output fiber. The optical signal is generated, and an initial position displacement of the signal image from a center of the first output fiber is estimated. Corrected settings for the phase elements are calculated, so that the phase elements with the corrected settings produce a corrected signal image of the optical signal with a corrected position displacement from the center of the output fiber that is less than the initial position displacement.

This description describes a fiber optic switching device, including a single PLM. The fiber optic switching device includes an input fiber array having input fibers and an output fiber array having output fibers. The PLM is located so that optical signals from the input fibers are directed by the PLM onto the output fibers. The PLM has phase elements, each of which modifies a phase of the optical signal. The fiber optic switching device also includes a memory component having data for setting phases of the phase elements. The fiber optic switching device further includes processing circuitry configured to set the phase elements with initial settings, to direct an optical signal from the first input fiber to a first output fiber. The processing circuitry is configured to subsequently generate an optical signal from the first input fiber of the input fiber array, the optical signal being imaged onto the output fiber array by the phase elements, to form an initial signal image on the output fiber array. The processing circuitry is also configured to estimate an initial position displacement of the initial signal image from a center of the first output fiber. The processing circuitry is further configured to calculate corrected settings for the phase elements. The corrected settings are calculated so that the corrected settings applied to the phase elements are configured to produce a first corrected signal image of the first optical signal having a corrected position displacement from the center of the first output fiber that is less than the initial first position displacement.

DETAILED DESCRIPTION

The drawings are not necessarily drawn to scale. This description is not limited by the illustrated ordering of acts or events, as some acts or events may occur in different orders and/or concurrently with other acts or events. Furthermore, some illustrated acts or events are optional.

Although some embodiments illustrated herein are shown in two-dimensional views with various regions having depth and width, those regions may illustrate a portion of a device that is actually a three-dimensional structure. Accordingly, those regions have three dimensions, including length, width and depth, when fabricated on an actual device.

Figure 1A:
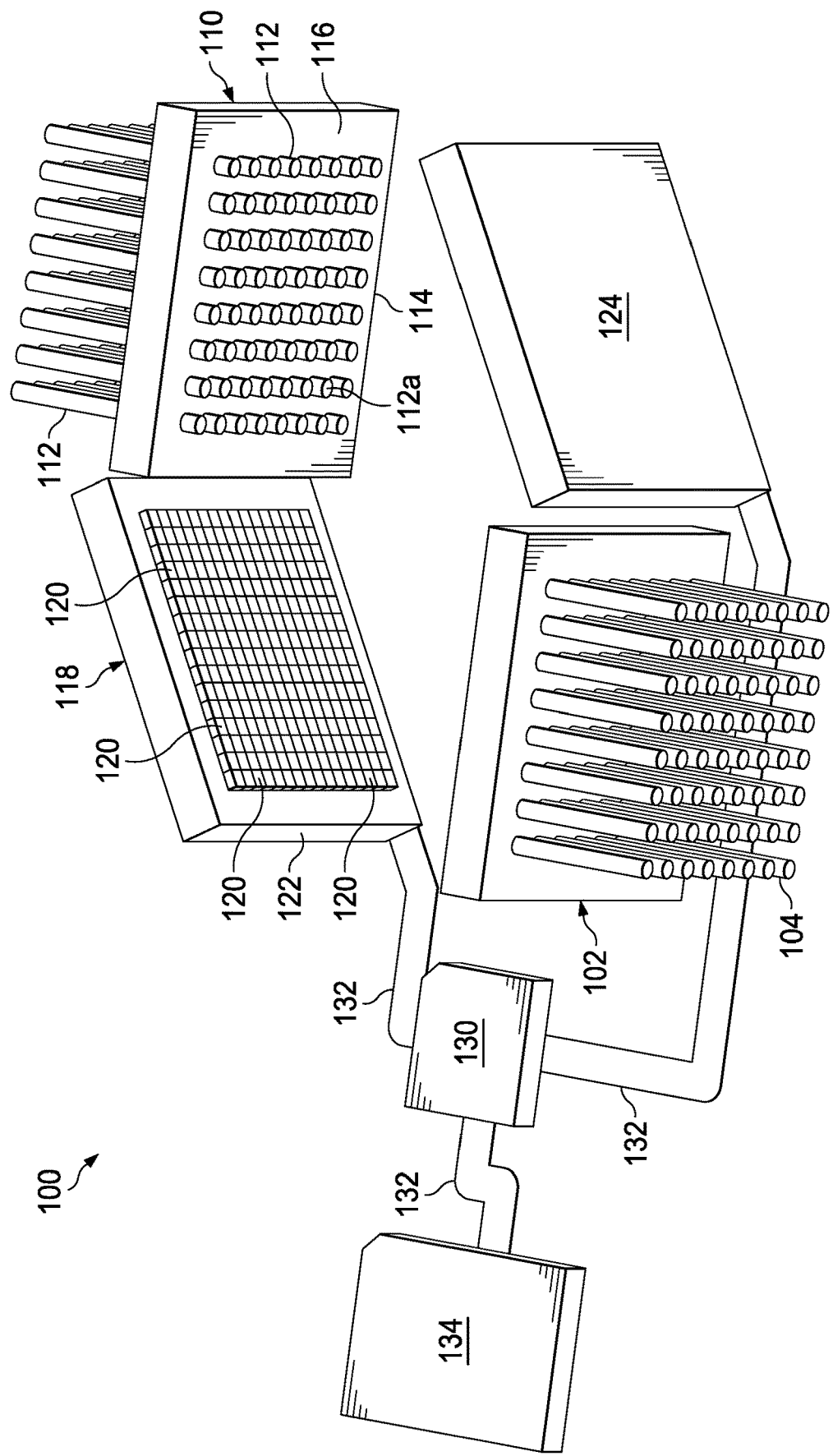
FIG. 1A and FIG. 1B are perspective views of an example fiber optic switching device that includes two PLMs.
Figure 1B:
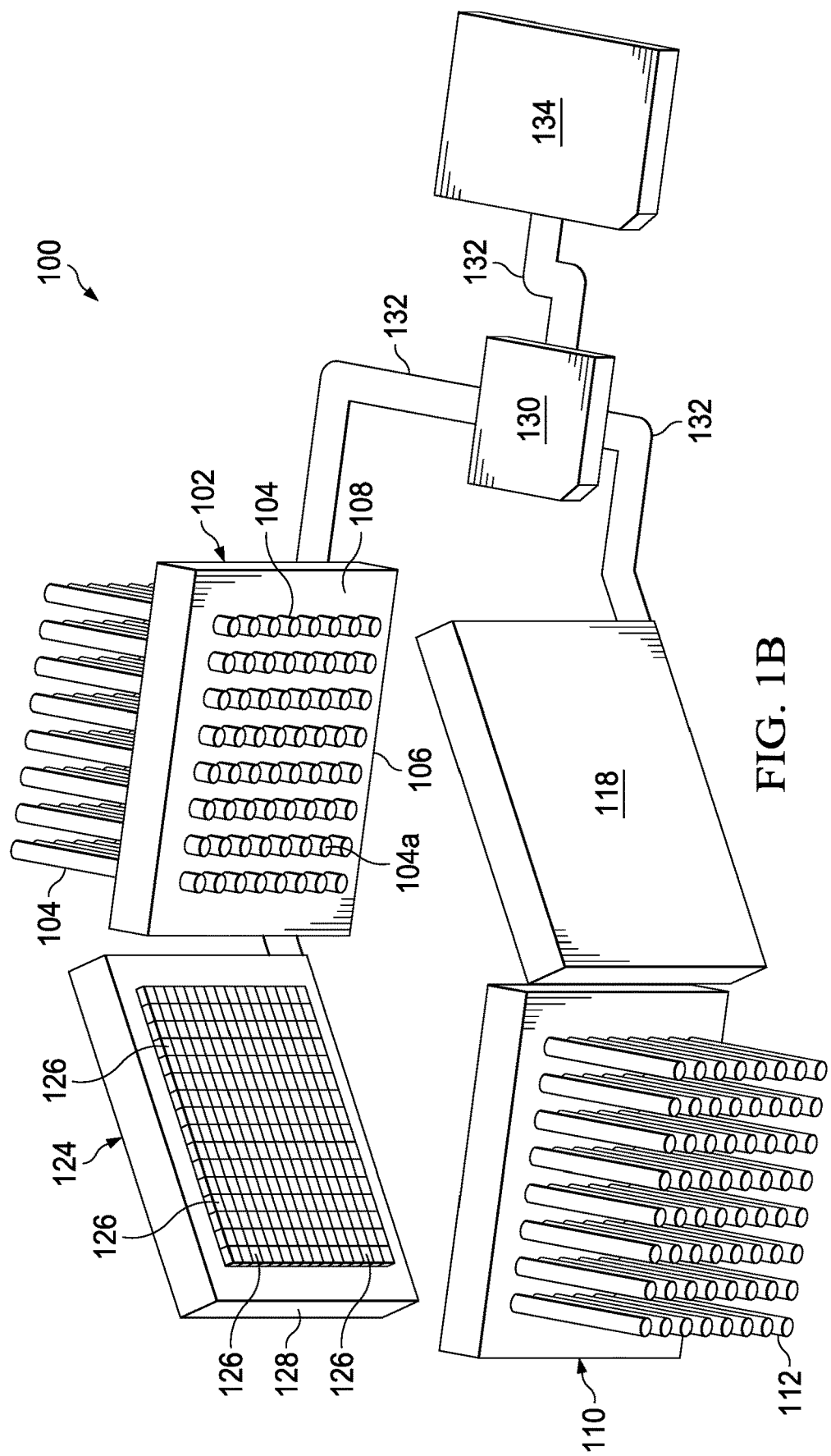

FIG. 1A and FIG. 1B are perspective views of an example fiber optic switching device that includes two PLMs. The fiber optic switching device 100 includes an input fiber array 102 having input fibers 104 held in place by an input frame 106. The input fibers 104 are exposed and terminate at a front side 108 of the input frame 106, as depicted in FIG. 1B.

The fiber optic switching device 100 includes an output fiber array 110 having output fibers 112 held in place by an output frame 114. The output fibers 112 are exposed and terminate at a front side 116 of the output frame 114, as depicted in FIG. 1A.

The fiber optic switching device 100 includes a first PLM 118 adjacent to the output fiber array 110, facing a region between the input fiber array 102 and a second PLM 124. The first PLM 118 has first phase elements 120 configured to modify phases of optical signals from the input fiber array 102. The first phase elements 120 may be implemented as piston reflectors, tilt reflectors, or liquid crystal reflectors, by way of example. Liquid crystal reflectors may be implemented as liquid crystal on silicon (LCOS) reflectors. The first phase elements 120 are located on a first frame 122, which may include a substrate used for fabrication of the first phase elements 120.

The fiber optic switching device 100 includes the second PLM 124 adjacent to the input fiber array 102, facing a region between the output fiber array 110 and the first PLM 118. The second PLM 124 has second phase elements 126 configured to modify phases of optical signals from the first PLM 118. The second phase elements 126 may be implemented as the same type of phase elements as the first phase elements 120. The second phase elements 126 are located on a second frame 128.

The fiber optic switching device 100 includes processing circuitry 130 configured to set the first phase elements 120 with first settings and configure the second phase elements 126 with second settings, to direct an optical signal from one of the input fibers 104 to one of the output fibers 112. The processing circuitry 130 may be implemented as a microprocessor, a digital signal processor, a microcomputer, or a microcontroller, by way of example. The processing circuitry 130 is coupled to the first PLM 118 and the second PLM 124 by data connectors 132. The fiber optic switching device 100 also includes a memory component 134 having data for configuring the first settings and the second settings. The memory component 134 may be implemented as non-volatile memory such as flash memory component, for example. Alternatively, the memory component 134 may be implemented as remote data storage, for example, in a network. The memory component 134 is coupled to the processing circuitry 130 by the data connectors 132.

The processing circuitry 130 is configured to perform one or more methods of aligning optical signals in the fiber optic switching device 100, from the input fibers 104, reflected off the first PLM 118 and the second PLM 124, to the output fibers 112. For example, the processing circuitry 130 is configured to set the first phase elements 120 with first initial settings and configure the second phase elements 126 with second initial settings, to direct an optical signal from a first input fiber 104a to a first output fiber 112a. The processing circuitry 130 is configured to subsequently generate the optical signal from the first input fiber 104a, the first optical signal being imaged onto the output fiber array 110 by the first phase elements 120 and the second phase elements 126, to form an initial signal image on the output fiber array 110. The processing circuitry 130 is also configured to estimate an initial position displacement of the initial signal image from a center of the first output fiber 112a. The processing circuitry 130 is further configured to calculate first corrected settings for the first phase elements 120 and second corrected settings for the second phase elements 126. The first and second corrected settings are calculated so that the first and second phase elements with the first and second corrected settings are configured to produce a first corrected signal image of the first optical signal having a corrected position displacement from the center of the first output fiber 112*a* that is less than the initial first position displacement.

Figure 2:
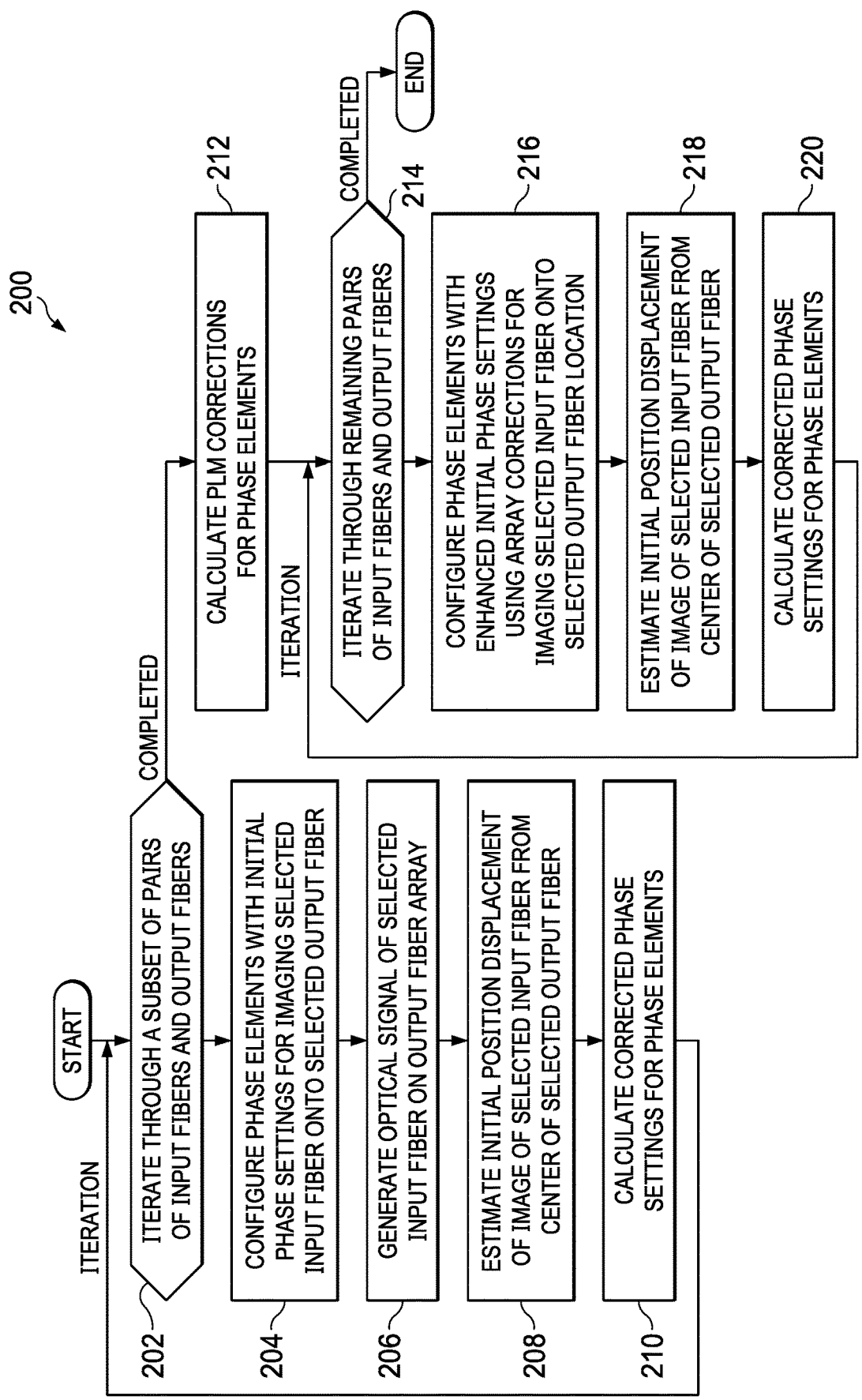
FIG. 2 is a flowchart of an example method of aligning optical signals in a fiber optic switching device.

FIG. 2 is a flowchart of an example method of aligning optical signals in a fiber optic switching device. Steps described in this method 200 refer to the fiber optic switching device 100 of FIG. 1A and FIG. 1B. The method 200 may be applied to other fiber optic switching devices having other configurations, for example, fiber optic switching devices having a single PLM. The fiber optic switching device includes processing circuitry 130 configured to perform at least some of the steps of the method 200 of this example.

The method 200 includes step 202, which is to iterate through a subset of pairs of input fibers 104 and output fibers 112. In each iteration of step 202, steps 204 through 210 are executed. The input fibers 104 of the pairs may be selected to spatially span the input fiber array 102. By way of illustration, the input fibers 104 of the pairs may include every fourth input fiber 104, or every tenth input fiber 104, for example, in a first lateral direction across the input fiber array 102, and may include every fourth input fiber 104, or every tenth input fiber 104, in a second lateral direction, orthogonal to the first lateral direction, across the input fiber array 102. Other arrangements of the input fibers 104 of the pairs are within the scope of this example. Similarly, the output fibers 112 of the pairs may be selected to spatially span the output fiber array 110. The pairs of input fibers 104 and output fibers 112 may include every combination of input fibers 104 with output fibers 112, or may include a subset of the possible combinations of input fibers 104 with output fibers 112.

Each iteration of step 202 includes step 204, which is to configure the first phase elements 120 with first initial settings and configure the second phase elements 126 with second initial settings, for imaging a selected input fiber 104 onto a selected output fiber 112. The first initial settings may be based on a nominal position of the selected input fiber 104, that is, a position of the selected input fiber 104 with no positional error due to assembly tolerances of the selected input fiber 104 in the input fiber array 102, no positional error due to assembly tolerances of the input fiber array 102 in the fiber optic switching device 100, and no positional error due to assembly tolerances of the first PLM 118 in the fiber optic switching device 100. Analogously, the second initial settings may be based on a nominal position of the selected output fiber 112, that is, a position of the selected output fiber 112 with no positional error due to assembly tolerances of the selected output fiber 112 in the output fiber array 110, no positional error due to assembly tolerances of the output fiber array 110 in the fiber optic switching device 100, and no positional error due to assembly tolerances of the second PLM 124 in the fiber optic switching device 100.

Each iteration of step 202 includes step 206, which is to generate an optical signal from the selected input fiber 104 while the first phase elements 120 have the first initial settings and the second phase elements 126 have the second initial settings, thus imaging the optical signal on the output fiber array 110. The optical signal may be implemented as a steady signal, a pulsed signal, a repetitive signal, or an encoded signal having a complex waveform, by way of example.

Each iteration of step 202 includes step 208, which is to estimate an initial position displacement, from a center of selected output fiber 112, of the image of the optical signal from the selected input fiber 104. In one version of this step, the initial position displacement may be estimated by acquiring signal measurements from the selected output fiber 112 and from output fibers 112 immediately adjacent to the selected output fiber 112, and fitting the signal measurements to a gaussian beam profile using a least squares method. The initial position displacement is obtained from a difference between a peak of the gaussian beam profile and the selected output fiber 112.

In another version of this step, the initial position displacement may be estimated by placing an imaging device, such as a camera sensor, not shown in FIG. 1A and FIG. 1B, between the second PLM 124 and the output fiber array 110, or by temporarily replacing the output fiber array 110 with the imaging device. Sensor elements in the imaging device may be more densely arranged than the output fibers 112, providing a more accurate estimate of the initial position displacement.

Each iteration of step 202 includes step 210, which is to calculate first corrected settings for the first phase elements 120 and calculate second corrected settings for the second phase elements 126. The first corrected settings and the second corrected settings are calculated so that when the corrected settings are applied to the first phase elements 120 and the second phase elements 126, a corrected signal image of the optical signal has a corrected position displacement from the center of the first output fiber 112 that is less than the initial position displacement. Details of the method to calculate the corrected settings are described in reference to FIG. 7. Information for the first corrected settings and the second corrected settings may be saved in the memory component 134 of FIG. 1A and FIG. 1B, for configuring the first phase elements 120 and the second phase elements 126 during operation of the fiber optic switching device 100. In one version of this example, the full first corrected settings and the full second corrected settings may be saved in the memory component 134, advantageously enabling rapid configuration of the first phase elements 120 and the second phase elements 126 during operation. In another version, a compressed version of the first corrected settings and the second corrected settings may be saved in the memory component 134, advantageously reducing memory capacity requirement of the memory component 134.

After all the iterations of step 202 are completed, the method 200 continues with step 212, which is to calculate first PLM correction factors for the first phase elements 120 and calculate second PLM correction factors for the second phase elements 126. The first PLM correction factors may be calculated using the first initial settings and the corresponding first corrected settings for all the iterations of step 202. The first PLM correction factors may compensate for positional errors of the input fiber array 102 and the first PLM 118. The second PLM correction factors may be calculated using the second initial settings and the corresponding second corrected settings for all the iterations of step 202. The second PLM correction factors may compensate for positional errors of the output fiber array 110 and the second PLM 124. Examples of positional error include translational errors and tilt errors.

Following step 212, the method 200 continues with step 214, which is to iterate through remaining pairs of input fibers 104 and output fibers 112 which were not addressed in the iterations of step 202. In each iteration of step 214, steps 216 through 220 are executed.

Each iteration of step 214 includes step 216, which is to configure the first phase elements 120 with first enhanced initial settings using the first PLM correction factors, and configure the second phase elements 126 with second enhanced initial settings using the second PLM correction factors, for imaging a selected input fiber 104 onto a selected output fiber 112. The first enhanced initial settings may start with first initial settings, as described in reference to step 204, and may be adjusted by applying the first PLM correction factors that were calculated in step 212. Similarly, the second enhanced initial settings may start with second initial settings, as described in reference to step 204, and may be adjusted by applying the second PLM correction factors that were calculated in step 212.

Each iteration of step 214 includes step 218, which is to generate an optical signal from the selected input fiber 104 while the first phase elements 120 have the first initial settings and the second phase elements 126 have the second initial settings, thus imaging the optical signal on the output fiber array 110. Step 218 also includes estimating an initial position displacement of the imaged optical signal from a center of the selected output fiber 112. The initial position displacement may be estimated as described in reference to step 208.

Each iteration of step 214 includes step 220, which is to calculate first corrected settings for the first phase elements 120 and calculate second corrected settings for the second phase elements 126. The first corrected settings and the second corrected settings are calculated so that when the corrected settings are applied to the first phase elements 120 and the second phase elements 126, a corrected signal image of the optical signal has a corrected position displacement from the center of the first output fiber 112 that is less than the initial position displacement. Details of the method to calculate the corrected settings are described in reference to FIG. 7. An average of the initial position displacements estimated for the pairs of input fibers 104 and output fibers 112 in step 218 may be less than an average of the initial position displacements estimated for the pairs of input fibers 104 and output fibers 112 in step 210, as a result of using the first PLM correction factors and second PLM correction factors from step 216, which may advantageously reduce times required to calculate the first corrected settings and the second corrected settings, compared to times required to calculate the corrected settings in step 210. Information for the first corrected settings and the second corrected settings may be saved in the memory component 134, as described in reference to step 210.

Figure 3:
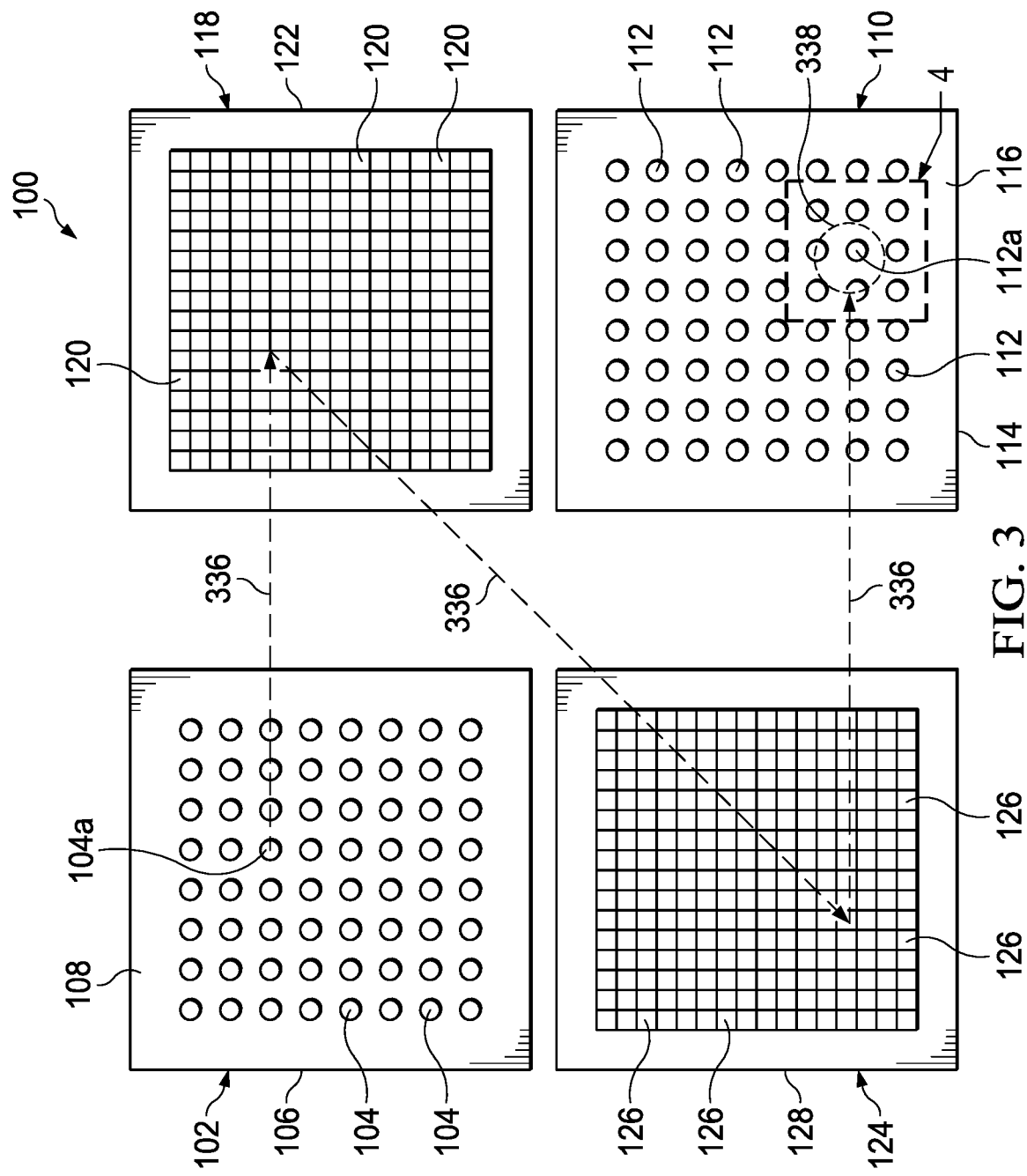
FIG. 3 schematically depicts propagation of the optical signal in steps 204 and 206 of the method of FIG. 2.

FIG. 3 schematically depicts propagation of the optical signal in steps 204 and 206 of the method 200 of FIG. 2. The input fiber array 102, the first PLM 118, the second PLM 124, and the output fiber array 110 are depicted out of position, to indicate propagation of the optical signal 336 from a selected input fiber 104a to a selected output fiber 112a. The first phase elements 120 are configured with the first initial settings and the second phase elements 126 are configured with the second initial settings. As described in reference to step 204 of FIG. 2. The optical signal 336 is generated from the selected input fiber 104a, and propagates toward the first PLM 118. The optical signal 336 is reflected and focused by at least a plurality of the first phase elements 120 toward the second PLM 124. The optical signal 336 is reflected and focused by at least a plurality of the second phase elements 126 toward the output fiber array 110, and imaged on the front side 116 of the output frame 114 to produce an initial signal image 338 proximate to the selected output fiber 112a.

Figure 4:
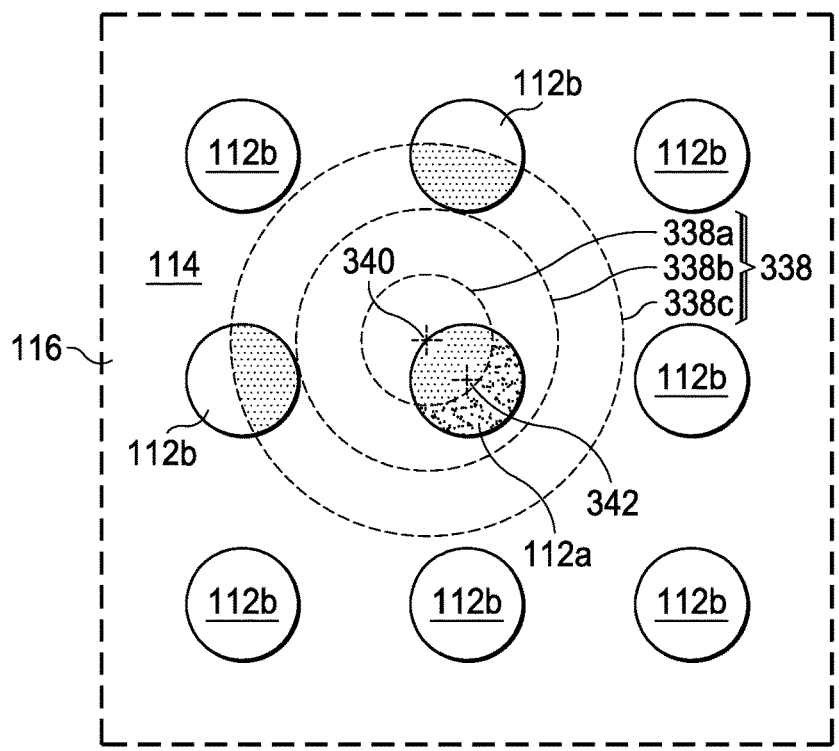
FIG. 4 schematically depicts the initial signal image of FIG. 3 proximate to the selected output fiber, and extraction of the initial position displacement.

FIG. 4 schematically depicts the initial signal image 338 of FIG. 3 proximate to the selected output fiber 112a, and extraction of the initial position displacement, as described in reference to steps 204 through 208 of the method 200 of FIG. 2. The initial signal image 338 may have a signal power distribution that is highest proximate to a signal center 340 of the initial signal image 338, and decreases as a function of distance from the signal center 340. The initial signal image 338 may be approximately circular, that is, having less than 10 percent eccentricity, may be approximately elliptic, or may have a more complex shape. The initial signal image 338 may be characterized by equal power contours, in which the signal power is constant along each equal power contour. The equal power contours are depicted in FIG. 4 by dashed lines. By way of illustration, the initial signal image 338 may include a central region 338a enclosed by a first equal power contour around a signal center 340 of the initial signal image 338, an annular region 338b enclosed by a second equal power contour around the central region 338a, and an outer region 338c enclosed by a third equal power contour around the annular region 338b. The central region 338a may have a central average signal power density, which may be expressed in microwatts/micron$^2$. The annular region 338b may have an annular average signal power density that is lower than the central average signal power density, and the outer region 338c may have an outer average signal power density that is lower than the annular average signal power density. In alternate versions of this example, additional equal power contours may be employed to illustrate the signal power distribution of the initial signal image 338.

The initial signal image 338 may overlap a portion, or all, of the selected output fiber 112a, and may overlap a portion, or all, of one or more adjacent optical output fibers 112b, as depicted in FIG. 4. By way of example, the central region 338a may overlap a portion of the selected output fiber 112a, and the annular region 338b may overlap a portion of the selected output fiber 112a, as indicated in FIG. 4. The outer region 338c may overlap portions of two of the adjacent optical output fibers 112b, as depicted in FIG. 4. Other configurations of the initial signal image 338 with respect to the selected output fiber 112a and the adjacent optical output fibers 112b may be expected to be encountered when performing the method of FIG. 2.

The signal power into the selected output fiber 112a is the signal power distribution of the initial signal image 338 integrated over an area of the selected output fiber 112a. Analogously, the signal powers into each of the adjacent optical output fibers 112b are the signal power distribution of the initial signal image 338 integrated over areas of the adjacent optical output fibers 112b.

The signal power into the selected output fiber 112a is measured, and signal powers into each of the adjacent optical output fibers 112b are measured. The measured signal power into the selected output fiber 112a and the measured signal powers into each of the adjacent optical output fibers 112b are used to estimate an initial position displacement of the signal center 340 of the initial signal image 338 from a fiber center 342 of the selected output fiber 112a. The initial position displacement may be expressed as a horizontal distance between the signal center 340 and the fiber center 342, and a vertical distance between the signal center 340 and the fiber center 342. Alternatively, the initial position displacement may be expressed as a total distance between the signal center 340 and the fiber center 342, and an angle from the fiber center 342 to the signal center 340. The initial position displacement may be estimated by fitting a shape of the signal power distribution of the initial signal image 338 to the measured signal powers. By way of example, the shape of the signal power distribution of the initial signal image 338 may be a gaussian shape, and may be fitted using a least squares methodology.

Figure 5:
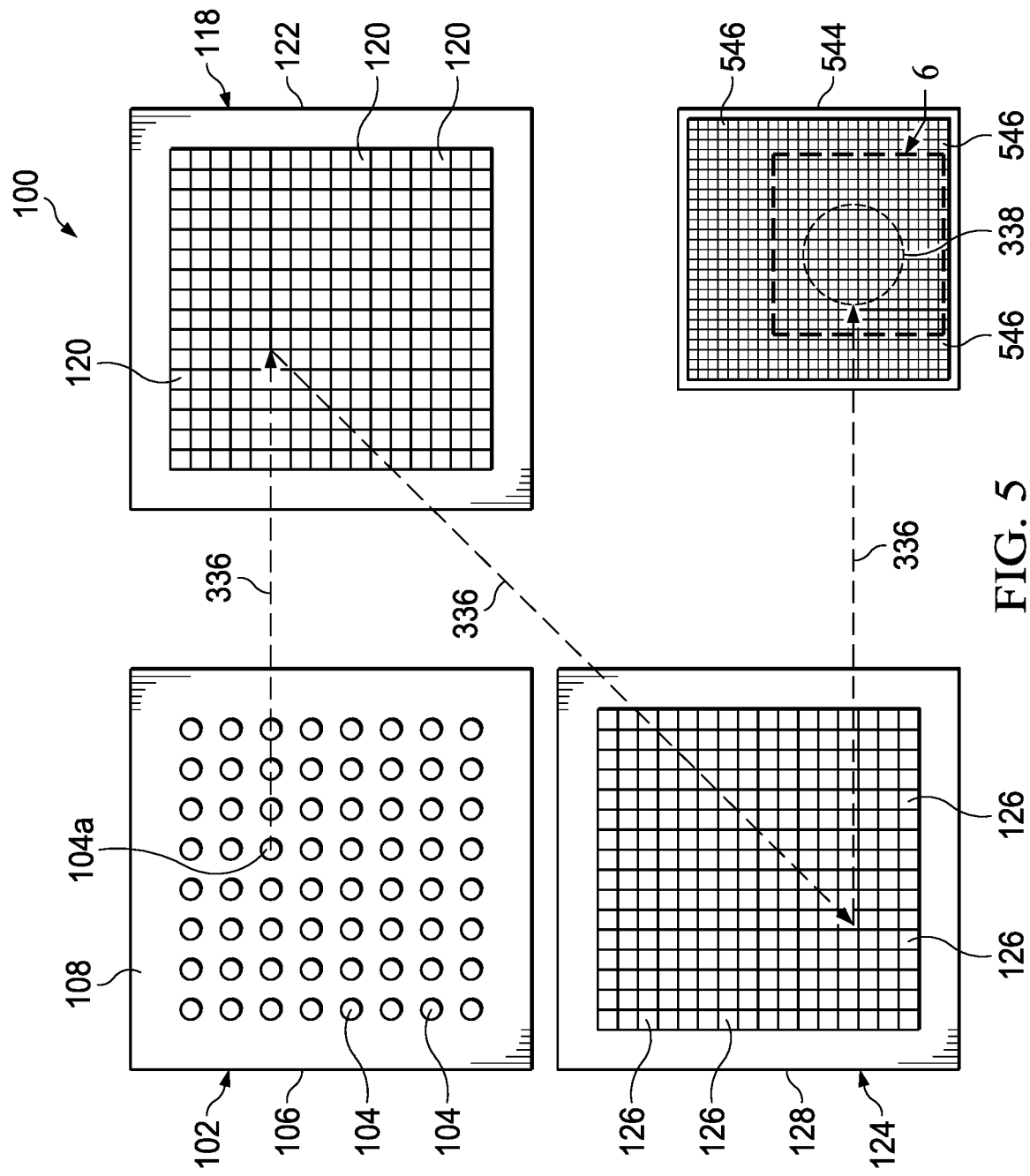
FIG. 5 schematically depicts an alternate method of locating the signal center of the initial signal image.

FIG. 5 schematically depicts an alternate method of locating the signal center 340 of the initial signal image 338 of FIG. 4. In this alternate method, an imaging device 544 is substituted for the output fiber array 110. The imaging device 544 may be implemented as a camera sensor, for example. The imaging device 544 has sensor elements 546 which are configured to detect the initial signal image 338. FIG. 5 depicts propagation of the optical signal from the input fiber array 102 to the imaging device 544. The input fiber array 102, the first PLM 118, the second PLM 124, and the imaging device 544 are depicted out of position, to indicate propagation of the optical signal 336 from a selected input fiber 104a to sensor elements 546 of the imaging device 544. The first phase elements 120 are configured with the first initial settings and the second phase elements 126 are configured with the second initial settings, as described in reference to step 204 of FIG. 2. The optical signal 336 is generated from the selected input fiber 104a, and propagates toward the first PLM 118. The optical signal 336 is reflected and focused by at least a plurality of the first phase elements 120 toward the second PLM 124. The optical signal 336 is reflected and focused by at least a plurality of the second phase elements 126 toward the imaging device 544, and imaged on the sensor elements 546 to produce the initial signal image 338.

Figure 6:
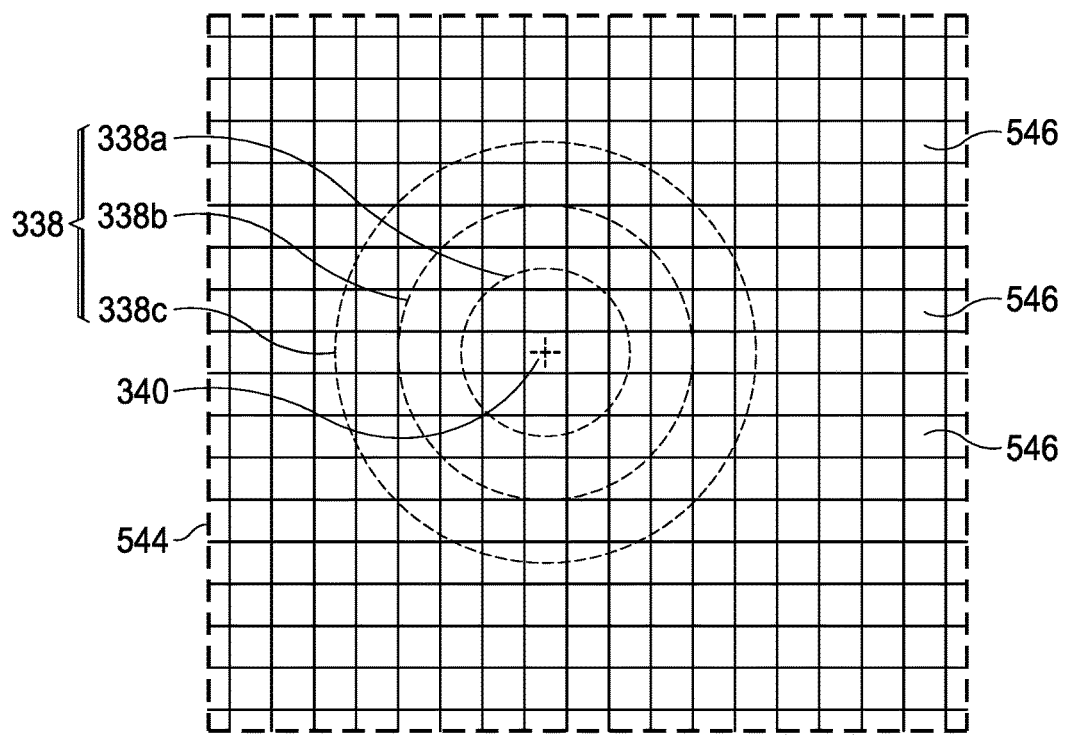
FIG. 6 schematically depicts the initial signal image on the sensor elements.

FIG. 6 schematically depicts the initial signal image 338 of FIG. 3 on the sensor elements 546. The initial signal image 338 may have a signal power distribution that is highest proximate to a signal center 340 of the initial signal image 338, and decreases as a function of distance from the signal center 340, as illustrated by equal power contours, depicted in FIG. 6 by dashed lines, as described in reference to FIG. 4. The initial signal image 338 may include a central region 338a around the signal center 340, an annular region 338b around the central region 338a, and an outer region 338c around the annular region 338b.

The initial signal image 338 may overlap a plurality of the sensor elements 546. The signal powers into the sensor elements 546 are measured, and are used to estimate a location of the signal center 340. The sensor elements 546 may be more closely positioned to each other than the output fibers 112 of FIG. 4, enabling a more accurate estimate of the location of the signal center 340 compared with using the output fiber array 110 of FIG. 4. The initial position displacement of the signal center 340 of the initial signal image 338 from a fiber center 342 of the selected output fiber 112a, shown in FIG. 4, may be estimated by computing a difference between the estimated location of the signal center 340 provided by use of the imaging device 544 and a known location of the selected output fiber 112a.

Figure 7:
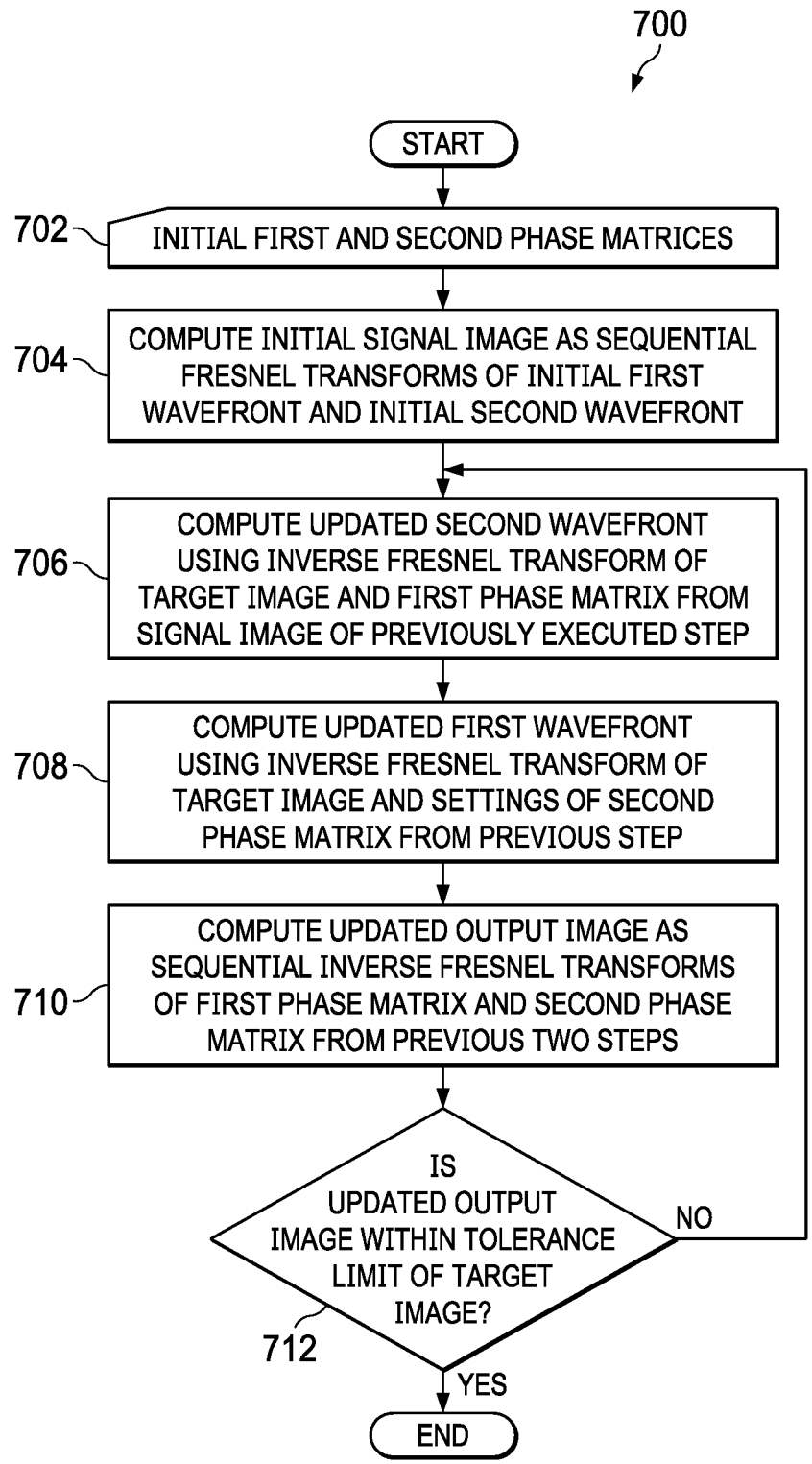
FIG. 7 is a flow chart of an example method of calculating corrected settings for the phase elements, corresponding to steps 210 and 220 of the method of FIG. 2.

FIG. 7 is a flow chart of an example method of calculating corrected settings for the phase elements, corresponding to steps 210 and 220 of the method 200 of FIG. 2. Steps described in this method 700 refer to the fiber optic switching device 100 of FIG. 1A and FIG. 1B. The method 700 is expressed in terms of the following complex entities: an input image of the signal at the input fiber array 102; a first wavefront of the signal reflected from the first PLM 118, a second wavefront reflected from the second PLM 124, an output image at the output fiber array 110, and a target image of the desired signal at the output fiber array 110 having the signal located on the selected output fiber 112a. The target image may optionally include regions at harmonics of the phase elements The first wavefront, the second wavefront, and the output image are varied in successive iterations in the method 700. Each complex entity may be represented by a matrix of complex numbers; each matrix element has a corresponding amplitude and phase.

The method 700 begins with step 702, which is to acquire an initial first wavefront and an initial second wavefront. The initial first wavefront may be based on the input image with a nominal position for the selected input fiber 104a. An initial first wavefront may be computed as a Fresnel transform of the input image, and an initial first phase matrix is computed as the phases of the initial first wavefront matrix elements. The initial second wavefront may be based on the target image, and may be computed as an inverse Fresnel transform of the target image. The second initial phase matrix is computed as the phases of the second initial wavefront matrix elements. The phase matrix elements correspond to the settings of the first phase elements 120 and the second phase elements 126, as described in reference to step 204 of the method 200 of FIG. 2. Alternatively, the initial first phase matrix may be implemented as first enhanced initial settings using first PLM correction factors, and the second initial phase matrix may be implemented as second enhanced initial settings using the second PLM correction factors, as described reference to step 216 of the method 200 of FIG. 2. Other matrix values for the first and second initial phase matrices are within the scope of this example.

The method 700 continues with step 704, which is to compute an initial output image $S^0$ as sequential Fresnel transforms of the initial first wavefront and the initial second wavefront. For the purposes of this description, the Fresnel transform may be defined by Equation 1:

$$u_z(x, y) = \frac{1}{\sqrt{j\lambda z}} \int\int u(X, Y) \exp\left[\frac{j\pi}{\lambda z}(x-X)^2\right] \exp\left[\frac{j\pi}{\lambda z}(y-Y)^2\right] dYdX \quad \text{Eq. 1}$$

and is abbreviated $FrT_z$ herein, for convenience and consistency with Zhao, where:
j is the square root of −1,
x and y are coordinates on the PLMs 118 and 124,
X and Y are coordinates on the front side 116 of the output fiber array 110,
λ is a wavelength of the optical signal 336 of FIG. 3, and
z is the distance between the second PLM 124 and the output fiber array 110, and the distance between the first PLM 118 and the second PLM 124, as appropriate.

The inverse Fresnel transform may be defined by Equation 2:

$$u(X, Y) = \frac{1}{\sqrt{-j\lambda z}} \int\int u_z(x, y) \exp\left[\frac{j\pi}{\lambda z}(X-x)^2\right] \exp\left[\frac{j\pi}{\lambda z}(Y-y)^2\right] dydx \quad \text{Eq. 2}$$

and is abbreviated $FrT_{-z}$ herein, for convenience and consistency with Zhao, where j, x and y, X and Y, λ, and z are as described for the Fresnel transform.

In an alternate version of the method 700, Fourier transforms may be used in place of the Fresnel transforms.

The initial output image $S^0(X, Y)$ may be computed using Equation 3:

$$(X,Y) = FrT_{Z_2}[FrT_{Z_1}(\exp(j\varphi_1''(x,y)))(\exp(j\varphi_2''(x,y)))]$$

Eq. 3 $S^n$ where:
n=0 for the initial pass through step 702,
$\varphi^0_1$ is the initial first phase matrix,
$\varphi^0_2$ is the second initial phase matrix,
$Z_1$ is the distance between the first PLM 118 and the second PLM 124, and
$Z_2$ is the distance between the second PLM 124 and the output fiber array 110.

The method 700 continues with step 706, which is to compute an updated second wavefront using the target image and a first wavefront obtained from the complex image of the previously executed step, which may be step 702 in a first pass through step 704 and may be step 708 in successive passes. The target image may include negative regions located at harmonics of the optical signal due to periodicity of the phase elements 120 and 126. The updated second wavefront may be computed using Equation 4:

$$\exp\left(j\varphi_2^{n+1}(x, y)\right) = \qquad \text{Eq. 4}$$
$$FrT_{-z_2}\left[f(X, Y)\frac{S^n(X, Y)}{|S^n(X, Y)|}\right]/FrT_{z_1}(\exp(j\varphi_1^n(x, y)))$$

where:
f(X, Y) is the target image,
$\varphi^{n+1}_2$ is the updated phase matrix, and
$\varphi^n_1$ is the current first phase matrix.

The method 700 continues with step 708, which is to compute an updated first wavefront from the updated second wavefront and the target image. The updated first wavefront may be computed using Equation 5:

$$\exp\left(j\varphi_1^{n+1}(x, y)\right) = \qquad \text{Eq. 5}$$
$$FrT_{-z_1}\left[FrT_{-z_2}\left[f(X, Y)\frac{S^n(X, Y)}{|S^n(X, Y)|}\right]\exp\left(j\varphi_2^{n+1}(x, y)\right)^*\right]$$

where $\varphi^{n+1}_1$ is the updated first phase matrix, and the asterisk "*" denotes the complex conjugate.

The method 700 continues with step 710, which is to compute an updated output image at the output fiber array 110 using the updated wavefronts. The updated output image may be computed using Equation 6:

$$(X,Y) = FrT_{Z_2}[FrT_{Z_1}(\exp(j\varphi_1^{n+1}(x,y)))(\exp(j\varphi_2^{n+1}(x,y)))]$$
$$\text{Eq. 6} \quad S^{n+1}$$

where $S^{n+1}$ is the updated output image.

The method 700 continues with step 712, which is to determine if the updated output image matches the target image within a prescribed tolerance. By way of example, the prescribed tolerance may be expressed as a minimum signal power in an area for the selected output fiber 112a. The prescribed tolerance may be selected to provide sufficient signal power into the selected output fiber 112a to maintain a bit error rate below a desired level. If the updated output image does not match the target image within the prescribed tolerance, execution of the method 700 branches to step 706 for another iteration of computing the updated output image. If the updated output image does match the target image within the prescribed tolerance, execution of the method 700 terminates. The updated phase matrices are used to provide the corrected settings of steps 210 and 220 of the method of FIG. 2. The corrected settings may be computed as differences between a phase of the incoming wavefront and the updated phase matrices. The corrected settings may be stored in the memory component, to be applied to the phase elements 120 and 126 during operation of the fiber optic switching device 100.

Figure 8:
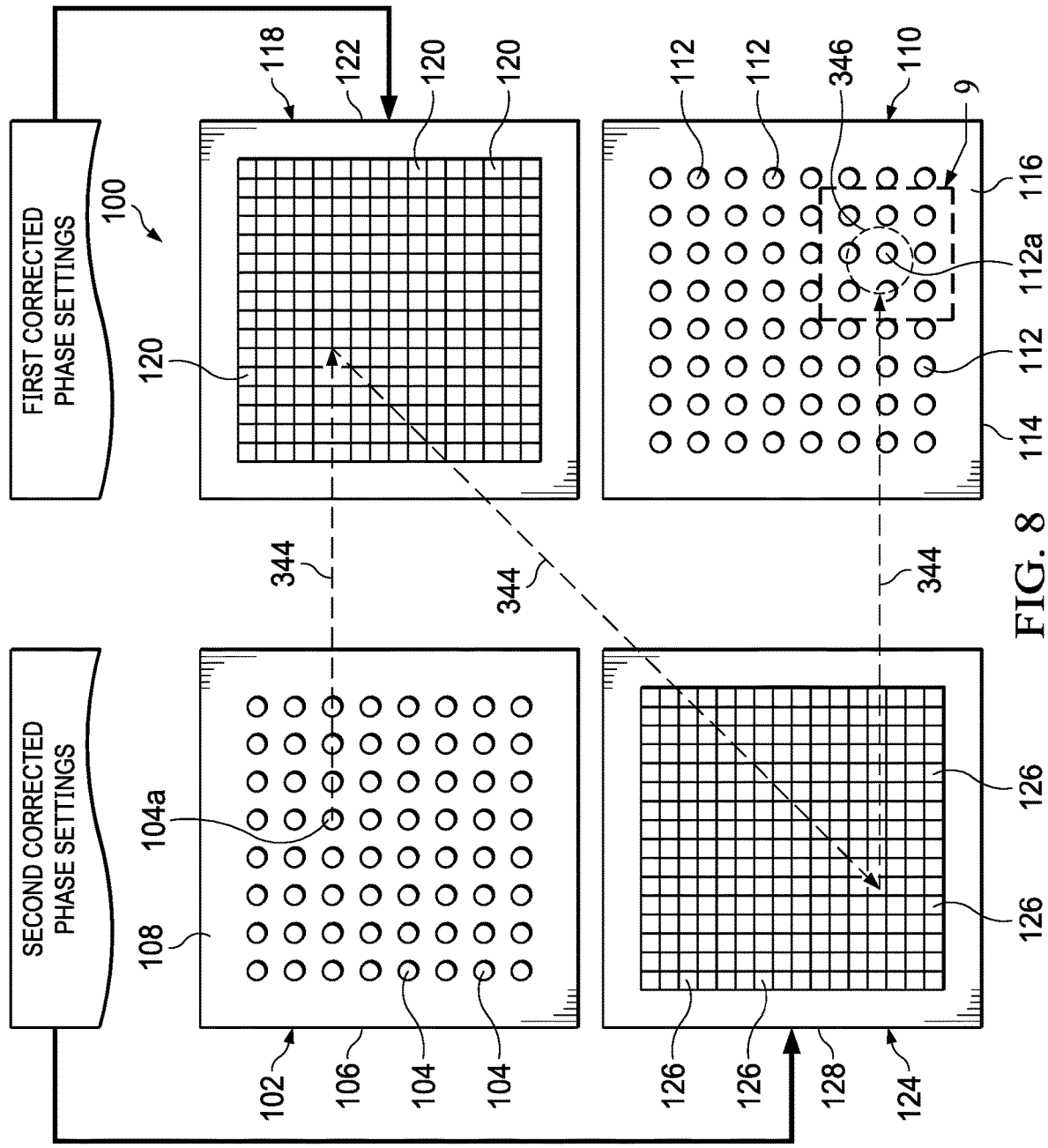
FIG. 8 schematically depicts propagation of the optical signal after step 210 of the method of FIG. 2.

FIG. 8 schematically depicts propagation of the optical signal after step 210 of the method 200 of FIG. 2. The input fiber array 102, the first PLM 118, the second PLM 124, and the output fiber array 110 are depicted out of position, similarly to FIG. 3, to indicate propagation of a corrected optical signal 344 from the selected input fiber 104a to the selected output fiber 112a. The first phase elements 120 are configured with the first corrected settings and the second phase elements 126 are configured with the second corrected settings. As described in reference to step 210 and step 220 of FIG. 2. The corrected optical signal 344 is generated from the selected input fiber 104a, and propagates toward the first PLM 118. The corrected optical signal 344 is reflected and focused by at least a plurality of the first phase elements 120 toward the second PLM 124. The corrected optical signal 344 is reflected and focused by at least a plurality of the second phase elements 126 toward the output fiber array 110, and imaged on the front side 116 of the output frame 114 to produce a corrected signal image 346 on the selected output fiber 112a. In one version of the method 200 of FIG. 2, the method 200 may be performed without physically generating the corrected optical signal 344; FIG. 8 illustrates predicted performance of the fiber optic switching device 100 after the corrected settings are computed in step 210.

Figure 9:
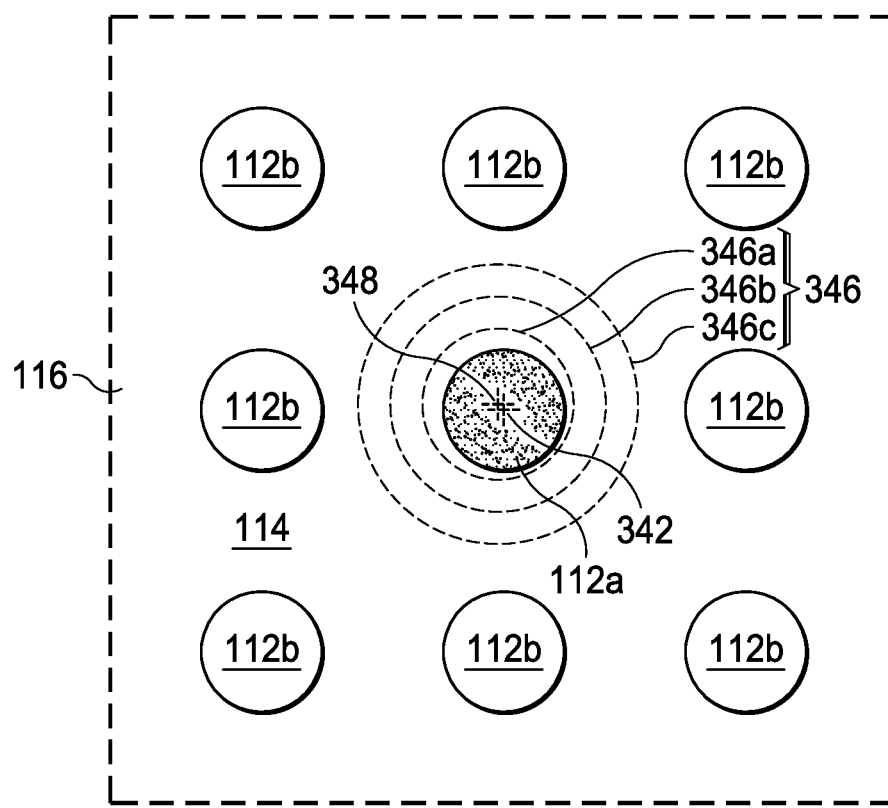
FIG. 9 schematically depicts the corrected signal image on the selected output fiber in greater detail.

FIG. 9 schematically depicts the corrected signal image 346 of FIG. 8 on the selected output fiber 112a in greater detail. The corrected signal image 346 has a corrected center 348; the signal power distribution decreases as a function of distance from the corrected center 348. The corrected signal image 346 may have less eccentricity than the initial signal image 338 of FIG. 4, as a result of calculating the corrected settings in steps 210 and 220 of FIG. 2. The corrected signal image 346 may be characterized by equal power contours, depicted in FIG. 9 by dashed lines, as explained in reference to FIG. 4. By way of illustration, the corrected signal image 346 may include a central region 346a enclosed by a first equal power contour around the corrected center 348, an annular region 346b enclosed by a second equal power contour around the central region 346a, and an outer region 346c enclosed by a third equal power contour around the annular region 346b. In alternate versions of this example, additional equal power contours may be employed to illustrate the signal power distribution of the initial signal image 338.

The corrected signal image 346 may overlap the selected output fiber 112a, while not extending to adjacent optical output fibers 112b, as depicted in FIG. 9. A corrected position displacement may be expressed as a horizontal distance between the corrected center 348 and the fiber center 342, and a vertical distance between the corrected center 348 and the fiber center 342, or may be expressed as a total distance between the corrected center 348 and the fiber center 342, and an angle from the fiber center 342 to the corrected center 348. The corrected position displacement may be less than the initial position displacement described in reference to FIG. 4, advantageously coupling more signal power into the selected output fiber 112a while reducing cross talk in the adjacent optical output fibers 112b

Figure 10:
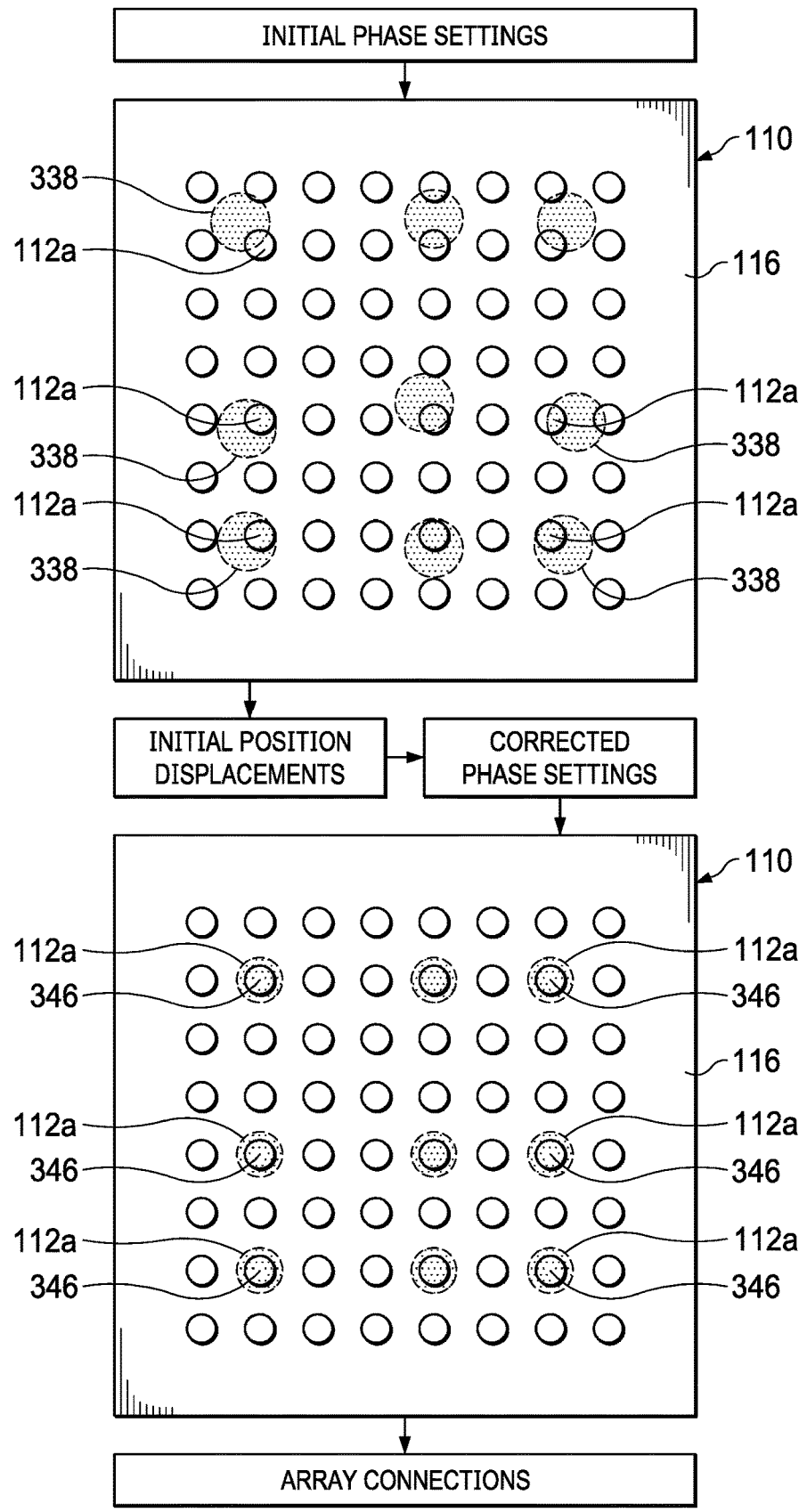
FIG. 10 depicts initial signal images for the iterations of step 202 of the method of FIG. 2, and corrected signal images for the iterations of step 202.

FIG. 10 depicts initial signal images 338 for the iterations of step 202 of the method 200 of FIG. 2, and corrected signal images 346 for the iterations of step 202. The initial settings, described in reference to step 204 of FIG. 2, are applied to the first phase elements 120 and the second phase elements 126. The initial signal images 338 may have initial position displacements which include random displacements and systematic displacements. The systematic displacements may be due to positional errors of the input fiber array 102, the first PLM 118, and the second PLM 124, of FIG. 1A and FIG. 1B, as well as the output fiber array 110.

Corrected settings for the first phase elements 120 and the second phase elements 126 of FIG. 1A and FIG. 1B are computed, as described in reference to step 210 of FIG. 2 and the method 700 of FIG. 7. Applying the corrected settings to the first phase elements 120 and the second phase elements 126 results in the corrected signal images 346. The corrected signal images 346 have acceptable corrected position displacements and provide sufficient signal power to the selected output fibers 112a to attain a bit error rate below a specified limit.

The systematic displacements of the initial position displacements obtained in the iterations of step 202 may be estimated by linear regression methods. The systematic displacements may be used to compute array corrections for the enhanced initial settings, as described in reference to steps 212 and 216 of FIG. 2.

Figure 11:
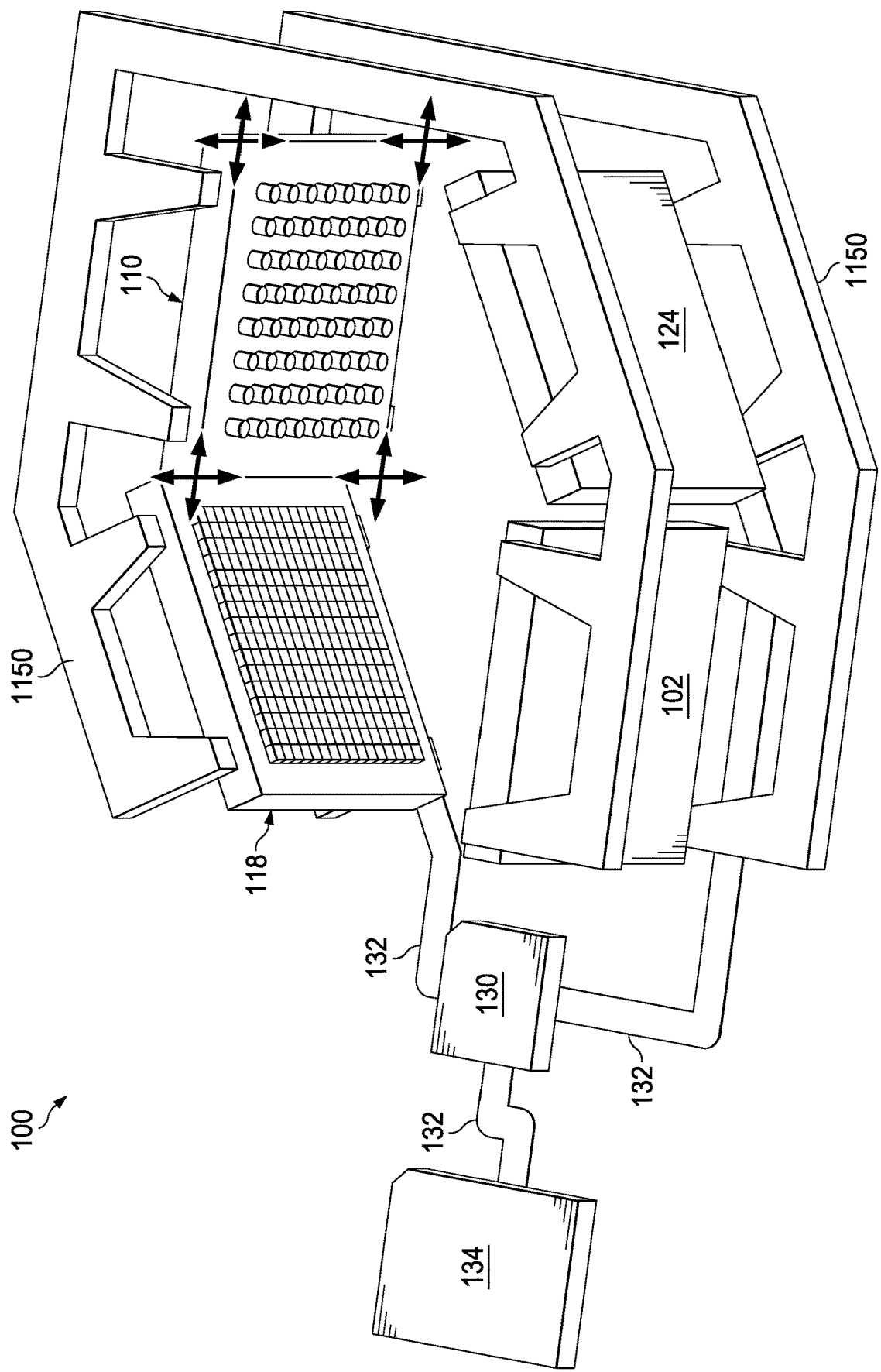
FIG. 11 depicts the fiber optic switching device with a reference frame.

FIG. 11 depicts the fiber optic switching device with a reference frame. The fiber optic switching device 100 has the input fiber array 102, the first PLM 118, the second PLM 124, and the output fiber array 110 adjustably coupled to the reference frame 1150. In versions of the examples described herein, after the systematic displacements are obtained, any or all of the input fiber array 102, the first PLM 118, the second PLM 124, and the output fiber array 110 may be positionally adjusted to compensate, partially or completely, for the systematic displacements described in reference to FIG. 10. By way of illustration, the output fiber array 110 may be positionally adjusted by moving one or more corners of the output fiber array 110 with respect to the reference frame 1150, as indicated schematically in FIG. 11. The output fiber array 110 may be secured in a new position after being positionally adjusted, by set screws or an adhesive, for example. The input fiber array 102, the first PLM 118, and the second PLM 124 may be similarly positionally adjusted and secured. After any or all of the input fiber array 102, the first PLM 118, the second PLM 124, and the output fiber array 110 have been positionally adjusted, steps 202 through 212 of the method 200 of FIG. 2 may be performed again, to update the corrected settings.

Figure 12:
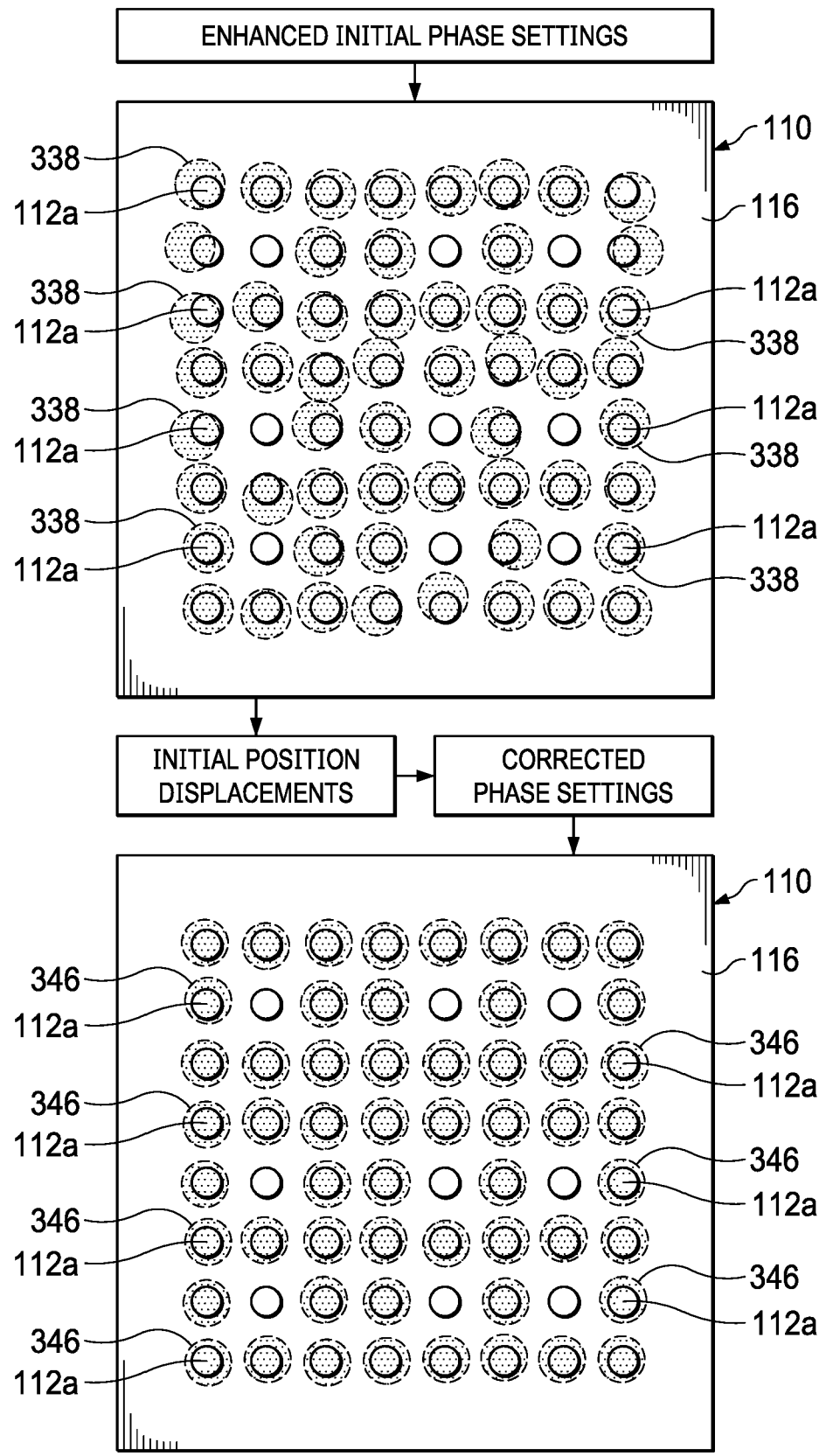
FIG. 12 depicts initial signal images for the iterations of step 214 of the method of FIG. 2, and corrected signal images for the iterations of step 202.

FIG. 12 depicts initial signal images 338 for the iterations of step 214 of the method 200 of FIG. 2, and corrected signal images 346 for the iterations of step 202. The enhanced initial settings, described in reference to step 216 of the method 200 of FIG. 2 and in reference to the method 700 of FIG. 7, are applied to the first phase elements 120 and the second phase elements 126. The initial signal images 338 may have initial position displacements which include random displacements and systematic displacements; the systematic displacements encountered in the iterations of step 214 may be less than the systematic displacements encountered in the iterations of step 202, due to the use of the array corrections of step 212 in generating the enhanced initial settings, advantageously reducing computational time needed for the iterations of step 214.

Corrected settings for the first phase elements 120 and the second phase elements 126 of FIG. 1A and FIG. 1B are computed, as described in reference to step 220 of FIG. 2 and the method 700 of FIG. 7. Applying the corrected settings to the first phase elements 120 and the second phase elements 126 results in the corrected signal images 346. The corrected signal images 346 have acceptable corrected position displacements and provide sufficient signal power to the selected output fibers 112a to attain a bit error rate below a specified limit.

Figure 13A:
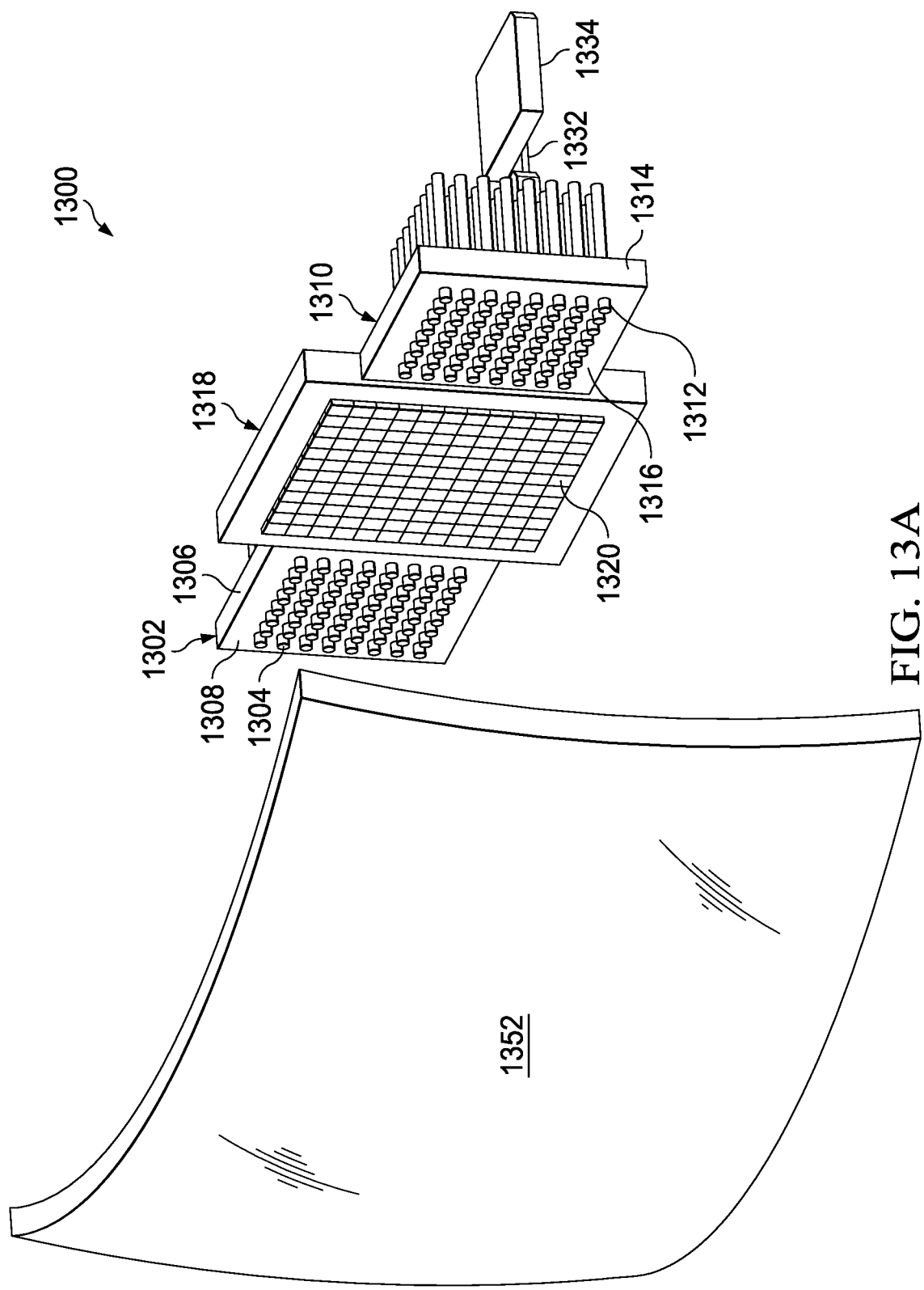
FIG. 13A and FIG. 13B are perspective views of an example fiber optic switching device that includes a single PLM.
Figure 13B:
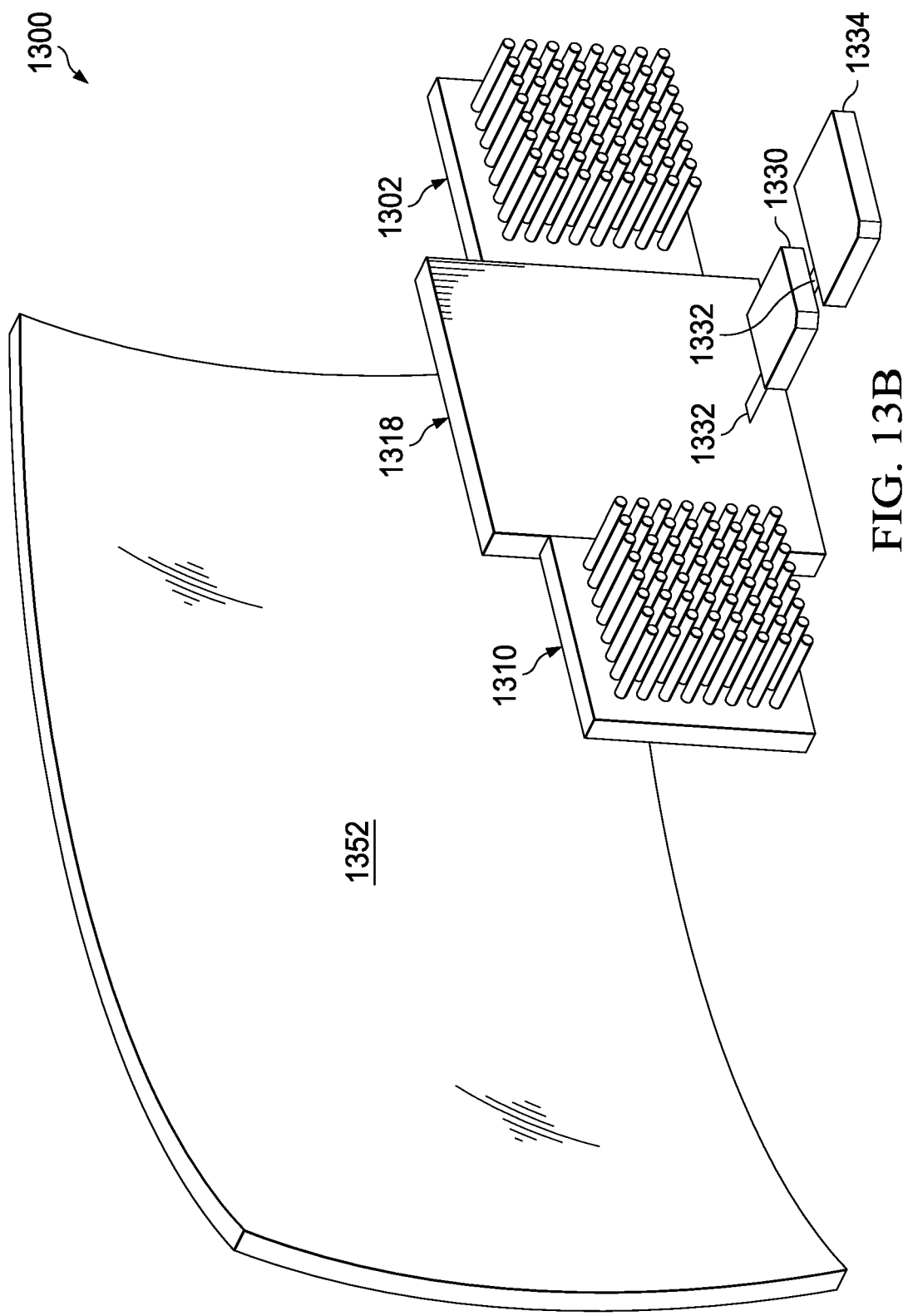

FIG. 13A and FIG. 13B are perspective views of an example fiber optic switching device that includes a single PLM. The fiber optic switching device 1300 includes an input fiber array 1302 having input fibers 1304 held in place by an input frame 1306. The input fibers 1304 are exposed and terminate at a front side 1308 of the input frame 1306, as depicted in FIG. 13A. The fiber optic switching device 1300 includes an output fiber array 1310 having output fibers 1312 held in place by an output frame 1314. The output fibers 1312 are exposed and terminate at a front side 1316 of the output frame 1314, as depicted in FIG. 13A.

The fiber optic switching device 1300 includes the PLM 1318 between the input fiber array 1302 and the output fiber array 1310. The PLM 1318 has phase elements 1320 configured to modify phases of optical signals from the input fiber array 1302 and redirect the optical signals to the output fiber array 1310. The phase elements 1320 may be implemented as piston reflectors, tilt reflectors, or liquid crystal reflectors, by way of example. In this example, the PLM 1318, the input fiber array 1302, and the output fiber array 1310 face a mirror 1352. The mirror 1352 may have a concave shape, as depicted in FIG. 13A and FIG. 13B, or may be flat. The PLM 1318, the input fiber array 1302, and the output fiber array 1310 are positioned with respect to the mirror 1352 to reflect the optical signals from the input fiber array 1302 to the PLM 1318, and to reflect the optical signals from the PLM 1318 to the output fiber array 1310.

The fiber optic switching device 1300 includes processing circuitry 1330 configured to set the phase elements 1320 with first settings, to direct an optical signal from one of the input fibers 1304 to one of the output fibers 1312, using the mirror 1352. The processing circuitry 1330 may be implemented as any of the examples described for the processing circuitry 130 of FIG. 1A and FIG. 1B. The processing circuitry 1330 is coupled to the PLM 1318 by a data connector 1332. The fiber optic switching device 1300 also includes a memory component 1334 having data for configuring the first settings and the second settings. The memory component 1334 may be implemented as any of the examples described for the memory component 1334 of FIG. 1A and FIG. 1B. The memory component 1334 is coupled to the processing circuitry 1330 by the data connectors 1332.

The processing circuitry 1330 is configured to perform one or more methods of aligning optical signals in the fiber optic switching device 1300, from the input fibers 1304, reflected off the mirror 1352 a first time, off the PLM 1318, and reflected off the mirror 1352 a second time, to the output fibers 1312. For example, the processing circuitry 1330 is configured to set the phase elements 1320 with initial settings, to direct an optical signal from a selected input fiber 1304 to a selected output fiber 1312. The processing circuitry 1330 is configured to subsequently generate the optical signal from the selected input fiber 1304, the optical signal being imaged onto the output fiber array 1310 by the phase elements 1320, to form an initial signal image on the output fiber array 1310. The processing circuitry 1330 is also configured to estimate an initial position displacement of the initial signal image from a center of the selected output fiber 1312. The processing circuitry 1330 is further configured to calculate corrected settings for the phase elements 1320. The corrected settings are calculated so that the phase elements with the corrected settings are configured to produce a corrected signal image of the optical signal having a corrected position displacement from the center of the selected output fiber 1312 that is less than the initial position displacement.

Optical signals in the fiber optic switching device 1300 may be aligned by the method 200 of FIG. 2. Operations in the method 200 relating to the second PLM and second phase elements may be bypassed when the method 200 is applied to the fiber optic switching device 1300. Details of calculating the corrected settings for the phase elements 1320 are described in reference to FIG. 15.

Figure 14A:
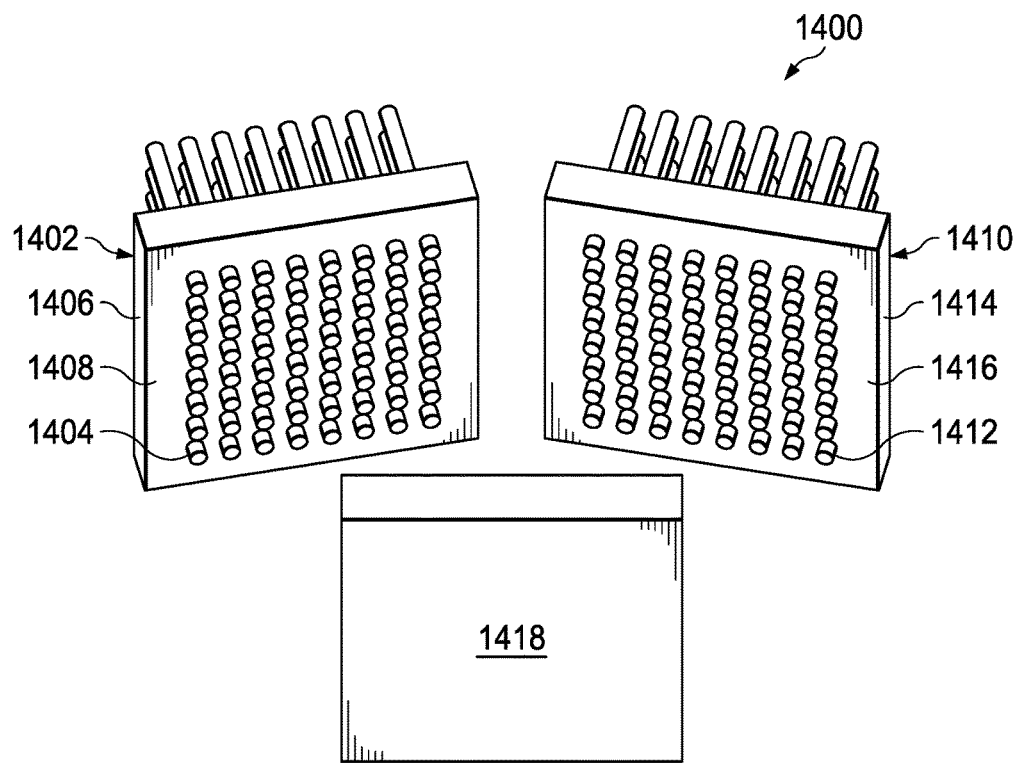
FIG. 14A and FIG. 14B are perspective views of another example fiber optic switching device that includes a single PLM.
Figure 14B:
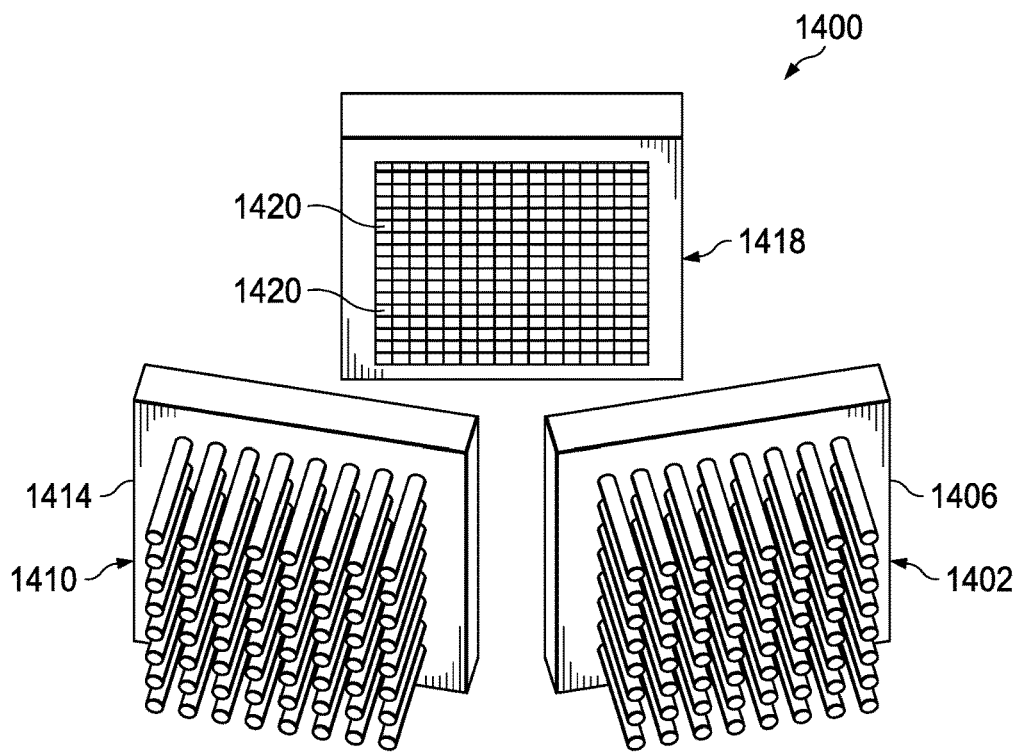

FIG. 14A and FIG. 14B are perspective views of another example fiber optic switching device that includes a single PLM. The fiber optic switching device 1400 includes an input fiber array 1402 having input fibers 1404 held in place by an input frame 1406. The input fibers 1404 are exposed and terminate at a front side 1408 of the input frame 1406, as depicted in FIG. 14A. The fiber optic switching device 1400 includes an output fiber array 1410 having output fibers 1412 held in place by an output frame 1414. The output fibers 1412 are exposed and terminate at a front side 1416 of the output frame 1414, as depicted in FIG. 14A. In this example, the input fiber array 1402 is adjacent to the output fiber array 1410.

The fiber optic switching device 1400 includes the PLM 1418 facing the input fiber array 1402 and the output fiber array 1410. The PLM 1418 has phase elements 1420 configured to modify phases of optical signals from the input fiber array 1402 and redirect the optical signals to the output fiber array 1410. The phase elements 1420 may be implemented as piston reflectors, tilt reflectors, or liquid crystal reflectors, by way of example. The PLM 1418 is positioned to reflect the optical signals from the input fiber array 1402 to the output fiber array 1410. The fiber optic switching device 1400 may include processing circuitry and a memory component coupled by data connectors, not shown in FIG. 14. The processing circuitry may be configured to perform one or more methods of aligning optical signals in the fiber optic switching device 1400, as described in reference to FIG. 13.

Optical signals in the fiber optic switching device 1400 may be aligned by the method 200 of FIG. 2. Operations in the method 200 relating to the second PLM and second phase elements may be bypassed when the method 200 is applied to the fiber optic switching device 1400. Details of calculating the corrected settings for the phase elements 1420 are described in reference to FIG. 15.

Figure 15:
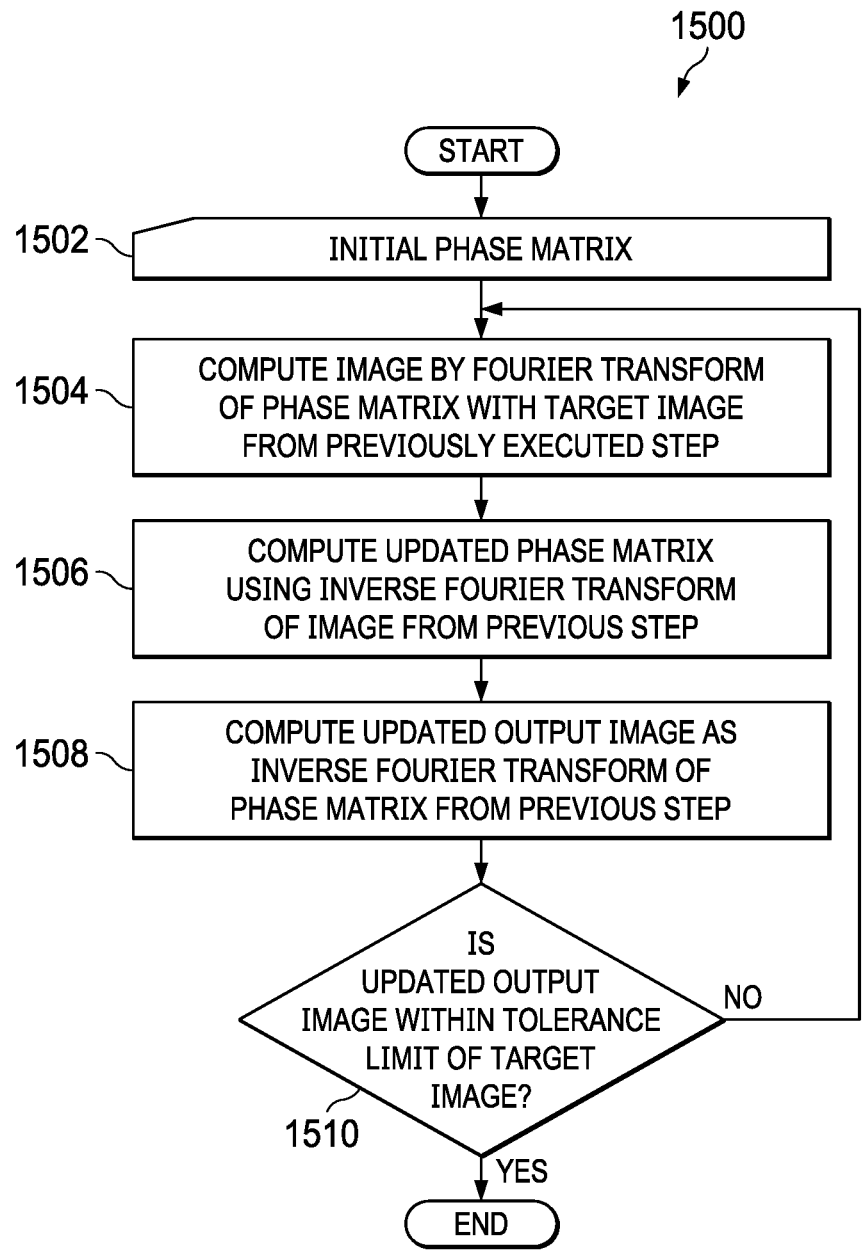
FIG. 15 is a flow chart of an example method of calculating corrected settings for the phase elements, corresponding to steps 210 and 220 of the method of FIG. 2.

FIG. 15 is a flow chart of an example method of calculating corrected settings for the phase elements, corresponding to steps 210 and 220 of the method 200 of FIG. 2. Steps described in this method 1500 refer to the fiber optic switching device 1300 of FIG. 13A and FIG. 13B and to the fiber optic switching device 1400 of FIG. 14A and FIG. 14B. The method 1500 is expressed in terms of the following complex entities: an input image of the signal at the input fiber array 1302; a wavefront of the signal reflected from the PLM 1318, an output image of the signal at the output fiber array 1310, and a target image of the desired signal at the output fiber array 1310 having the signal located on the selected output fiber 1312. The wavefront and the output image are varied in successive iterations in the method 1500.

The method 1500 begins with step 1502, which is to acquire an initial wavefront. The initial wavefront may be based on the input image with a nominal position of the selected input fiber 1304. Alternatively, the initial phase matrix may be implemented as enhanced initial settings using PLM correction factors, as described reference to step 216 of the method 200 of FIG. 2. An initial phase matrix is computed as the phases of the initial wavefront matrix elements. The phase matrix elements correspond to the settings of the phase elements 120 as described in reference to step 204 of the method 200 of FIG. 2. Alternatively, the initial phase matrix may be implemented as enhanced initial settings using PLM correction factors, as described reference to step 216 of the method 200 of FIG. 2. Other matrix values for the initial phase matrix are within the scope of this example. For the purposes of this description, the Fourier transform may be defined by Equation 7:

$$u(x,y)=\iint u(X,Y)\exp[-j2\pi(xX+yY)]dY\,dX \qquad \text{Eq. 7}$$

and is abbreviated FT herein, for convenience, where:
j is the square root of −1,
x and y are coordinates on the PLMs 118 and 124, and
X and Y are coordinates on the front side 116 of the output fiber array 110, The inverse Fourier transform may be defined by Equation 8:

$$u(X,Y)=\iint u(x,y)\exp[j2\pi(xX+yY)]dydx \qquad \text{Eq. 8}$$

and is abbreviated FT herein, for convenience, where j, x and y, and X and Y, are as described for the Fourier transform.

In an alternate version of the method 1500, Fresnel transforms may be used in place of the Fourier transforms.

The method 1500 continues with step 1504, which is to compute an output image $S^0$ by a Fourier transform of the settings obtained from the previously executed step and the target image. The previously executed step may be step 1502 in a first pass through step 1504 and may be step 1508 in successive passes.

The output image $S^9$ (X, Y) may be computed using Equation 9:

$$(X,Y)=FT[f(X,Y)(\exp(j\varphi^n(x,y))] \qquad \text{Eq. } 9^n$$

where:
n=0 for the initial pass through step 1502,
$\varphi^0$ is the initial first phase matrix, and
f(X, Y) is the target image.

The method 1500 continues with step 1506, which is to compute an updated phase matrix using a target image and a first phase matrix obtained from the previously executed step, which may be step 1502 in a first pass through step 1504 and may be step 1508 in successive passes. The updated second phase matrix may be computed using Equation 10:

$$0\ \exp(j\varphi^{n+1}(x,y)=\text{IFT}[S^n(X,Y))\exp(j\varphi^n(x,y))]/|S^n(X,Y)| \qquad \text{Eq.}$$

where $\varphi^{n+1}$ is the updated phase matrix.

The method 1500 continues with step 1508, which is to compute an updated output image from the updated phase matrix and the target image. The updated output image may be computed using Equation 11:

$$S^n(X,Y)=FT[f(X,Y)(\exp(j\varphi^{n+1}(x,y))]$$

where $\varphi^{n+1}{}_1$ is the updated first phase matrix.

The method 1500 continues with step 1510, which is to determine if the updated output image matches the target image within a prescribed tolerance. If the updated output image does not match the target image within the prescribed tolerance, execution of the method 1500 branches to step 1504 for another iteration of computing the updated output image. If the updated output image does match the target image within the prescribed tolerance, execution of the method 1500 terminates. The updated phase matrix is used to provide the corrected settings of steps 210 and 220 of the method of FIG. 2. The corrected settings may be computed as differences between a phase of the incoming wavefront and the updated phase matrix. The updated phase matrix may be stored in the memory component 1334, to be applied to the phase elements 1320 during operation of the fiber optic switching device 1300.

Figure 16:
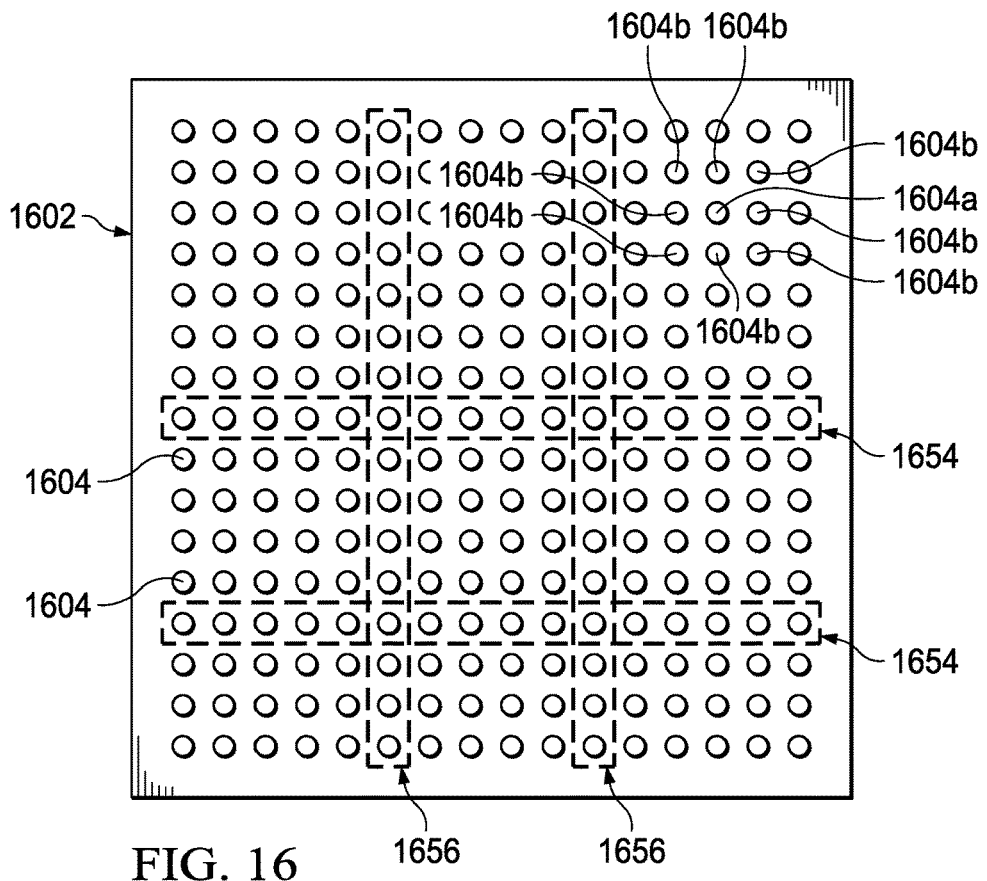
FIG. 16 depicts a rectangular arrangement of optical fibers in a fiber array.

FIG. 16 depicts an example arrangement of optical fibers in a fiber array. In this example, the fiber array 1602 has the optical fibers 1604 in a rectangular array, in which the optical fibers 1604 are arranged in perpendicular rows 1654 and columns 1656. Each row 1654 may have an equal number of the optical fibers 1604 as every other row 1654. Similarly, each column 1656 may have an equal number of the optical fibers 1604 as every other column 1656. The rows 1654 may be equally spaced apart, or may have variable spacings. Similarly, the columns 1656 may be equally spaced apart, or may have variable spacings. Each optical fiber 1604a in an interior of the fiber array 1602 has exactly eight immediately adjacent optical fibers 1604b oriented at intervals of 45 degrees. The number of the rows 1654 may be equal to the number of the columns 1656, so that the rectangular array is implemented as a square array, as depicted in FIG. 16. Alternatively, the number of the rows 1654 may be unequal to the number of the columns 1656. In some versions of this example, the number of optical fibers 1604 in each row 1654 may be an even power of 2, that is, the number of optical fibers 1604 in each row 1654 may be 8, 16, 32, 64, 128, or 256, for example. Similarly, in some versions of this example, the number of optical fibers 1604 in each column 1656 may be an even power of 2. The fiber array 1602 may be implemented as an input fiber array or an output fiber array, or both, in a fiber optic switching device, such as described in any of the examples herein.

Figure 17:
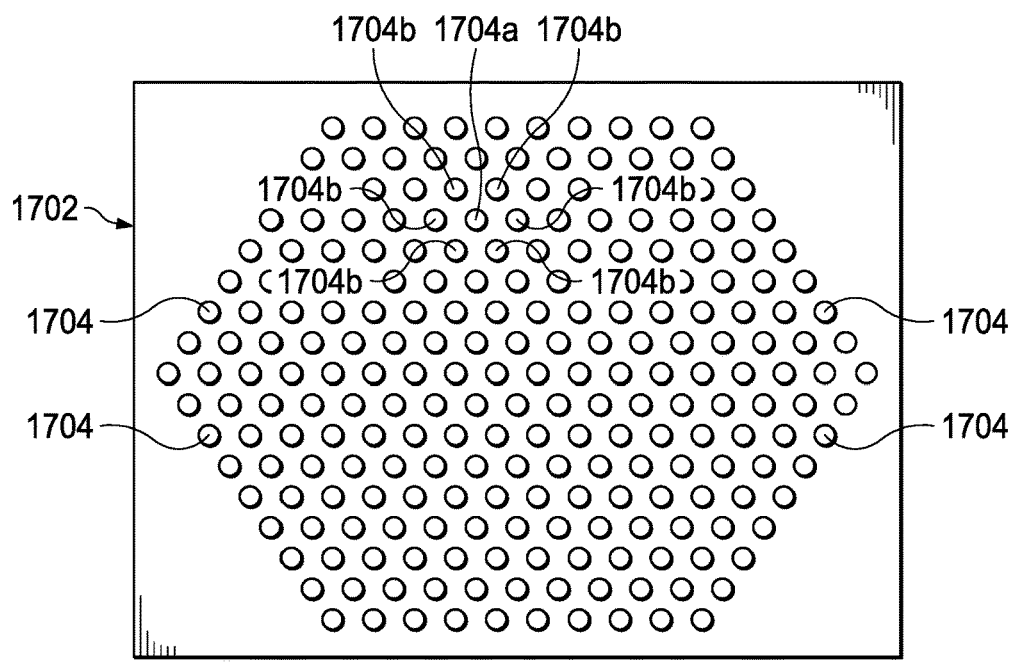
FIG. 17 depicts a hexagonal arrangement of optical fibers in a fiber array.

FIG. 17 depicts another example arrangement of optical fibers in a fiber array. In this example, the fiber array 1702 has the optical fibers 1704 in a hexagonal array, in which each optical fiber 1704a in an interior of the fiber array 1702 has exactly six immediately adjacent optical fibers 1704b oriented at intervals of 60 degrees. The hexagonal array may advantageously enable a higher density of the optical fibers 1704 in the fiber array 1702 compared to a rectangular array. The hexagonal array of the optical fibers 1704 in this example may have an overall hexagonal shape, as depicted in FIG. 17, or may alternatively have an overall rectangular shape or another overall shape. The fiber array 1702 may be implemented as an input fiber array or an output fiber array, or both, in a fiber optic switching device, such as described in any of the examples herein.

Figure 18:
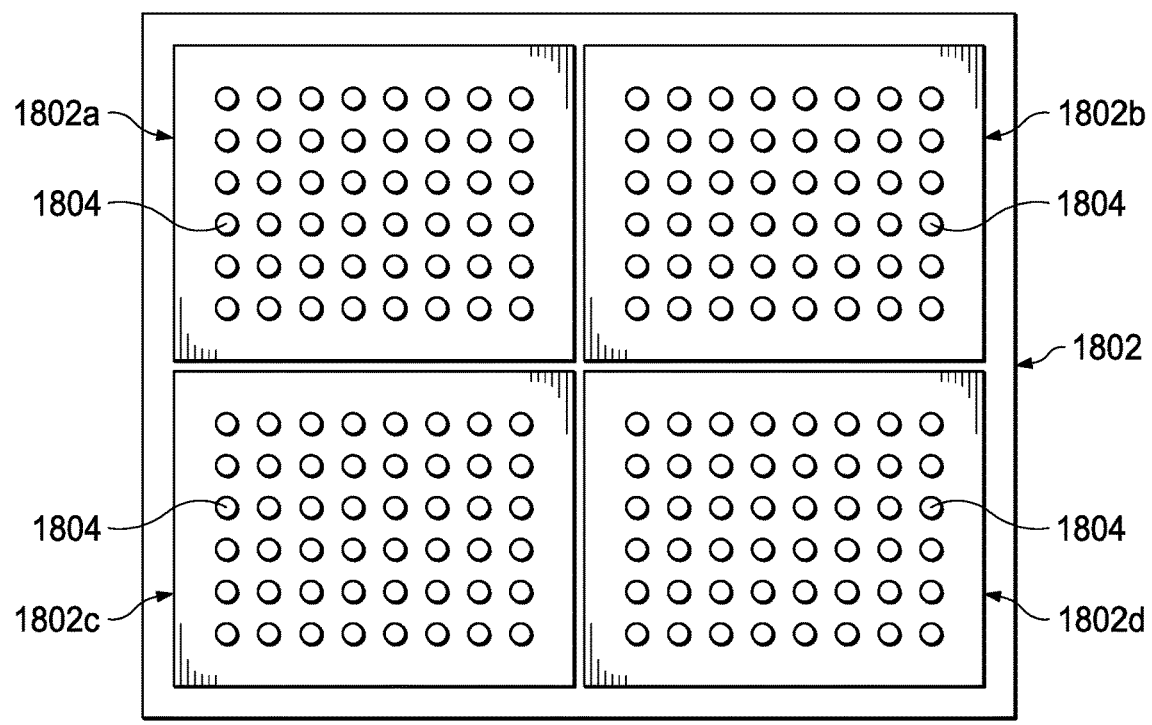
FIG. 18 depicts an example arrangement of optical fibers in a fiber array with subarrays.

FIG. 18 depicts a further example arrangement of optical fibers in a fiber array. In this example, the fiber array 1802 includes a plurality of fiber subarrays 1802a, 1802b, 1802c, and 1802d, each including optical fibers 1804. FIG. 18 depicts the fiber array 1802 with four fiber subarrays 1802a through 1802d; other versions of this example may have fewer or more fiber subarrays. The optical fibers 1804 in the fiber subarrays 1802a through 1802d may be configured in rectangular arrays, as depicted in FIG. 18, or may be configured in other arrangements, such as hexagonal arrays. The fiber array 1802 of this example may advantageously enable expansion of the fiber array 1802 using prefabricated fiber subarrays 1802a through 1802d. The fiber array 1802 may be implemented as an input fiber array or an output fiber array, or both, in a fiber optic switching device, such as described in any of the examples herein.

Figure 19:
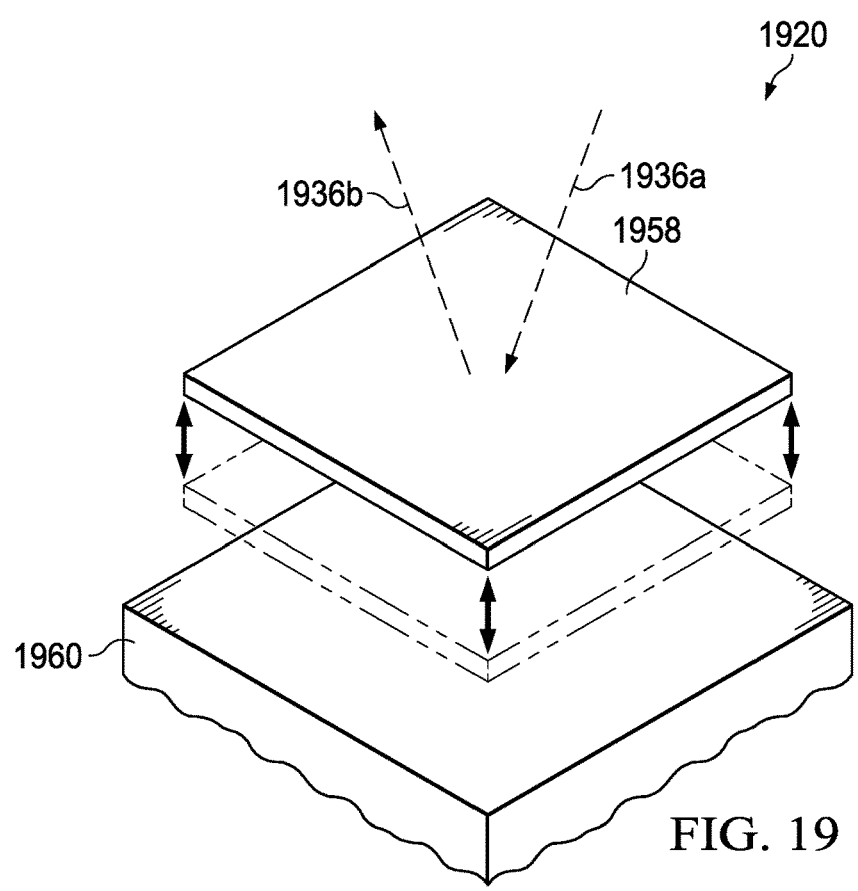
FIG. 19 depicts an example piston displacement phase element of a PLM.

FIG. 19 depicts an example piston displacement phase element of a PLM. The phase element 1920 includes a reflector 1958 which is movably coupled to a substrate 1960. During operation of the phase element 1920, an incident optical signal 1936a is reflected by the reflector 1958 to produce a reflected optical signal 1936b. The reflector 1958 moves in a direction perpendicular to the reflector 1958, referred to as a piston displacement operating mode, as indicated in FIG. 19, varying a phase of the reflected optical signal 1936b with respect to the incident optical signal 1936a. Circuitry, not shown, in the substrate 1960 drives the reflector 1958 to a prescribed position, producing a prescribed phase of the reflected optical signal 1936b. The piston displacement operating mode may advantageously produce less scattered signal in the reflected optical signal 1936b compared to other displacement operating modes. The phase element 1920 may be implemented in any of the PLMs described in the example herein.

Figure 20:
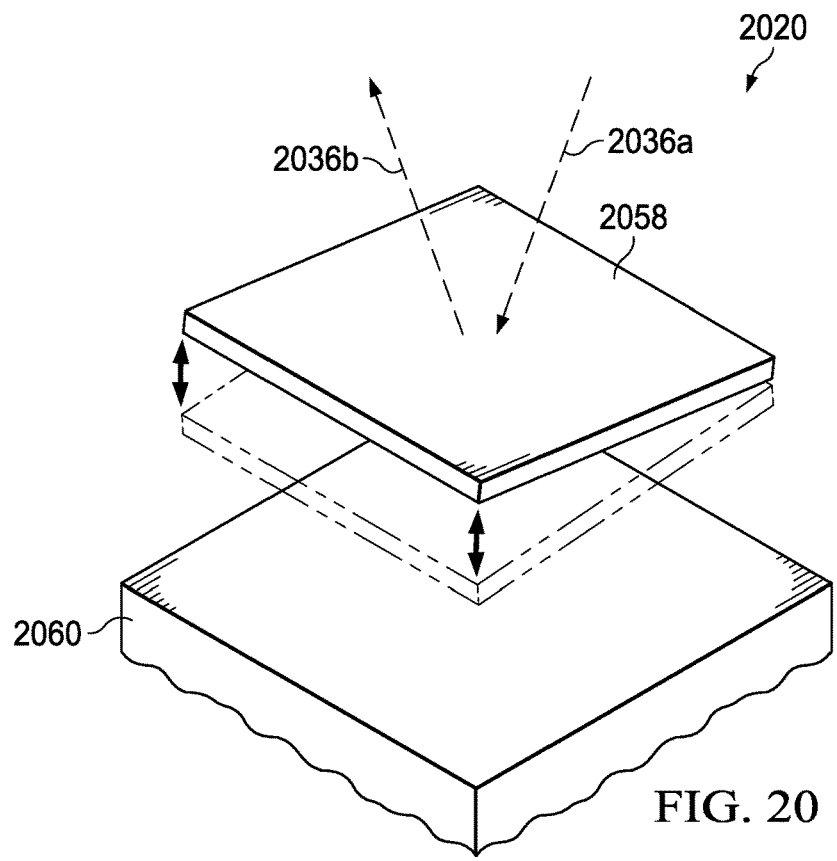
FIG. 20 depicts an example tilt displacement phase element of a PLM.

FIG. 20 depicts an example tilt displacement phase element of a PLM. The phase element 2020 includes a reflector 2058 which is movably coupled to a substrate 2060. During operation of the phase element 2020, an incident optical signal 2036a is reflected by the reflector 2058 to produce a reflected optical signal 2036b. The reflector 2058 tilts along an axis parallel to the reflector 2058, referred to as a tilt displacement operating mode, as indicated in FIG. 20, varying a phase of the reflected optical signal 2036b with respect to the incident optical signal 2036a. Circuitry, not shown, in the substrate 2060 drives the reflector 2058 to a prescribed position, producing a prescribed phase of the reflected optical signal 2036b. The tilt displacement operating mode may enable a lower fabrication cost of the phase element 2020 compared to phase elements having other displacement operating modes. The phase element 2020 may be implemented in any of the PLMs described in the example herein.

Figure 21:
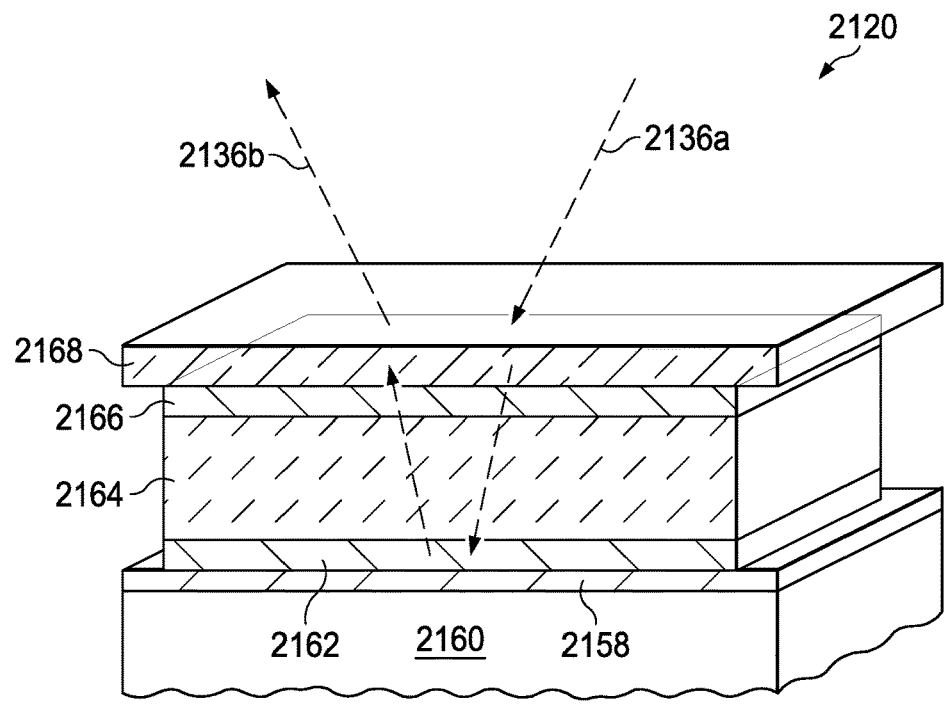
FIG. 21 depicts an example liquid crystal phase element of a PLM.

FIG. 21 depicts an example liquid crystal phase element of a PLM. The phase element 2120 includes a substrate 2160 with circuitry, not shown. The phase element 2120 also includes a reflective layer 2158 over the substrate 2160. The phase element 2120 further includes a lower electrode 2162 over the reflective layer 2158, liquid crystal material 2164 over the lower electrode 2162, and an upper electrode 2166 over the liquid crystal material 2164. The phase element 2120 may include a transparent protective layer 2168 over the upper electrode 2166. During operation of the phase element 2120, the circuitry applies a potential difference on the upper electrode 2166 and the lower electrode 2162, generating an electric field in the liquid crystal material 2164. An incident optical signal 2136a passes through the liquid crystal material 2164, is reflected by the reflective layer 2158 to produce a reflected optical signal 2136b, which passes through the liquid crystal material 2164 and exits the phase element 2120. Phases of the incident optical signal 2136a and the reflected optical signal 2136b are altered as they pass through the liquid crystal material 2164, so that the reflected optical signal 2136b has a desired phase difference with respect to the incident optical signal 2136a. The phase difference is determined by a strength of the electric field in the liquid crystal material 2164, which is set by the applied bias potential difference on the upper electrode 2166 and the lower electrode 2162. The phase element 2120 may be implemented in any of the PLMs described in the example herein.

Modifications are possible in the described embodiments, and other embodiments are possible, within the scope of the claims.

What is claimed is:

1. A method, comprising:
producing a first optical signal from an input fiber of an input fiber array;
imaging the first optical signal onto an output device by a first phase light modulator (PLM) having first phase elements configured with first initial settings and a second PLM having second phase elements configured with second initial settings, forming a first signal image on the output device;
determining a first initial position displacement of the first signal image from a goal position;
calculating first corrected settings for the first phase elements and second corrected settings for the second phase elements;
producing a second optical signal from the input fiber, the second optical signal being imaged onto the output device by the first PLM and the second PLM, the first phase elements having third initial settings and the second phase elements having fourth initial settings, to form a second signal image on the output device;
determining a second initial position displacement of the second signal image from the goal position;
calculating third corrected settings for the first phase elements and fourth corrected settings for the second phase elements;
calculating first PLM correction factors for the first phase elements using the first initial settings, the first corrected settings, the third initial settings, and the third corrected settings; and
calculating second PLM correction factors for the second phase elements using the second initial settings, the second corrected settings, the fourth initial settings, and the fourth corrected settings.

2. The method of claim 1, further comprising adjusting a position of a component after calculating the fourth corrected settings, wherein the component is selected from the group consisting of the input fiber array, the output device, the first PLM, and the second PLM.

3. The method of claim 1, further comprising:
producing a third optical signal from the input fiber;
imaging the third optical signal onto the output device by the first PLM and the second PLM, the first phase elements having enhanced fifth initial settings based on the first PLM correction factors, the second phase elements having enhanced sixth initial settings based on the second PLM correction factors, to form a third signal image on the output device;
determining a third initial position displacement of the third signal image from a third goal output; and
calculating fifth corrected settings for the first phase elements and sixth corrected settings for the second phase elements.

4. The method of claim 1, wherein the first corrected settings are calculated using iterations in which updated wavefronts are computed using previous values of updated wavefronts and a target image.

5. The method of claim 1, wherein the first phase elements are piston reflectors.

6. The method of claim 1, the method further comprising:
generating a second optical signal from the input fiber;
imaging the second optical signal onto an imaging component located at an image plane of the output device, wherein the first phase elements are configured with third initial settings and the second phase elements are configured with fourth initial settings, therein forming a second signal image on the imaging component; and
determining a second initial position displacement of the second signal image from the goal position.

7. The method of claim 1, wherein the output device is an output fiber array and the goal position is an output fiber of the output fiber array.

8. The method of claim 7, wherein input fibers of the input fiber array have an arrangement selected from the group consisting of a rectangular array, a hexagonal array, and a plurality of fiber subarrays, and output fibers of the output fiber array have an arrangement selected from the group consisting of a rectangular array, a hexagonal array, and a plurality of fiber subarrays.

9. The method of claim 1, wherein the output device is a camera.

10. The method of claim 1, further comprising applying the first corrected settings to the first phase elements and applying the second corrected settings to the second phase elements to produce a corrected signal image of the first optical signal having a corrected position displacement from the goal position that is less than the first initial position displacement.

11. The method of claim 1, further comprising configuring the first PLM with the first corrected settings and configuring the second PLM with the second corrected settings to produce an image on the output device, the image having a position displacement from the goal position less than the first initial position displacement.

12. A method, comprising:
producing an optical signal from an input fiber of an input fiber array;
imaging the optical signal onto an output device by a phase light modulator (PLM) having phase elements configured with initial settings, forming a signal image on the output device;
determining an initial position displacement of the signal image from a goal position; and
calculating corrected settings for the phase elements using iterations in which updated wavefronts are computed using previous values of updated wavefronts and a target image.

13. The method of claim 12, further comprising configuring the PLM with the corrected settings to produce an image on the output device, the image having a position displacement from the goal position less than the initial position displacement.

14. The method of claim 12, wherein the output device is an output fiber array and the goal position is an output fiber of the output fiber array.

15. The method of claim 12, wherein the output device is a camera.

16. The method of claim 12, further comprising producing a corrected signal image of the optical signal by applying the corrected settings to the phase elements, the corrected signal image having a corrected position displacement from the goal position that is less than the initial position displacement.

17. The method of claim 16, wherein the optical signal is a first optical signal, the initial settings are first initial settings, the signal image is a first signal image, the initial position displacement is a first initial position displacement, the goal position is a first goal position, the corrected settings are first corrected settings, the corrected signal image is a first corrected signal image, and the corrected position displacement is a first corrected position displacement, the method further comprising:

producing a second optical signal from the input fiber;

imaging the second optical signal onto the output device by the PLM, the phase elements having second initial settings, to form a second signal image on the output device;

determining a second initial position displacement of the second signal image from a second goal position; and calculating second corrected settings for the phase elements.

18. The method of claim 17, further comprising calculating PLM correction factors for the phase elements using the first initial settings, the first corrected settings, the second initial settings, and the second corrected settings.

19. The method of claim 18, further comprising:

generating a third optical signal from the input fiber;

imaging the third optical signal onto the output device by the PLM, the phase elements having third initial settings adjusted using the PLM correction factors, to form a third signal image on the output device;

determining a third initial position displacement of the third signal image from a third goal position; and calculating third corrected settings for the phase elements, wherein the third corrected settings applied to the phase elements produce a third corrected signal image of the third optical signal having a third corrected position displacement from the third goal position that is less than the third initial position displacement.

20. A device, comprising:

an input fiber array having input fibers;

a phase light modulator (PLM) having phase elements, the PLM optically coupled to the input fiber array;

an output device optically coupled to the PLM; and circuitry configured to:

configure the PLM with initial settings to instruct the PLM to image an optical signal from an input fiber of the input fiber array onto the output device by the phase elements configured with first initial settings, to form a signal image on the output device;

determine an initial position displacement of the signal image from a goal position indicating a center of an optical fiber;

calculate corrected settings for the phase elements; and configure the PLM with the corrected settings to produce an image on the output device, the image having a position displacement from the goal position less than the initial position displacement.

21. The device of claim 20, wherein the corrected settings applied to the phase elements are configured to produce a corrected signal image of the optical signal having a corrected position displacement from the goal position that is less than the initial position displacement.

22. The device of claim 21, wherein the optical signal is a first optical signal, the initial settings are first initial settings, the signal image is a first signal image, the initial position displacement is a first initial position displacement, the goal position is a first goal position, the corrected settings are first corrected settings, and the corrected signal image is a first corrected signal image wherein the PLM is configured to image a second optical signal from the input fiber array, onto the output device by the PLM, the phase elements having second initial settings, to form a second signal image on the output device, wherein the circuitry is further configured to:

determine a second initial position displacement of the second signal image from a second goal position of the output device; and calculate second corrected settings for the phase elements, wherein the second corrected settings applied to the phase elements are configured to produce a second corrected signal image of the second optical signal having a second corrected position displacement from the second goal position that is less than the second initial position displacement.

23. The device of claim 22, wherein the circuitry is further configured to:

calculate PLM correction factors for the phase elements using the first initial settings, the first corrected settings, the second initial settings, and the second corrected settings.

24. The device of claim 21, wherein the circuitry is further configured to store data in a memory component for generating corrected settings for the phase elements.

* * * * *